(12) United States Patent
Kawamura

(10) Patent No.: US 9,904,040 B2
(45) Date of Patent: Feb. 27, 2018

(54) IMAGING LENS AND IMAGING APPARATUS

(71) Applicant: FUJIFILM Corporation, Tokyo (JP)

(72) Inventor: Daiki Kawamura, Saitama (JP)

(73) Assignee: FUJIFILM Corporation, Tokyo (JP)

(*) Notice: Subject to any disclaimer, the term of this patent is extended or adjusted under 35 U.S.C. 154(b) by 32 days.

(21) Appl. No.: 15/067,791

(22) Filed: Mar. 11, 2016

(65) Prior Publication Data

US 2016/0274336 A1   Sep. 22, 2016

(30) Foreign Application Priority Data

Mar. 16, 2015   (JP) .................................. 2015-052259

(51) Int. Cl.
G02B 9/12 (2006.01)
G02B 13/02 (2006.01)
G02B 9/64 (2006.01)

(52) U.S. Cl.
CPC .............. *G02B 13/02* (2013.01); *G02B 9/64* (2013.01)

(58) Field of Classification Search
CPC . G02B 13/02; G02B 9/64; G02B 9/12; G02B 9/14
See application file for complete search history.

(56) References Cited

U.S. PATENT DOCUMENTS

2015/0378137 A1* 12/2015 Obikane ................ G02B 13/24 359/745

FOREIGN PATENT DOCUMENTS

| JP | 2012-047870 A | 3/2012 |
| JP | 2013-033178 A | 2/2013 |
| JP | 2013-097212 A | 5/2013 |
| JP | 2014-139699 A | 7/2014 |

* cited by examiner

*Primary Examiner* — Joseph P Martinez
(74) *Attorney, Agent, or Firm* — Studebaker & Brackett PC

(57) ABSTRACT

An imaging lens is constituted by, in order from the object side to the image side, a first lens group having a positive refractive power; a second lens group having a negative refractive power; and a third lens group having a positive refractive power. The second lens group has at least one positive lens and at least one negative lens. The second lens group moves along the optical axis from the object side to the image side while the first lens group and the third lens group are fixed with respect to an image formation plane to change focus from an object at infinity to an object at a proximal distance. Predetermined Conditional Formulae (1) and (2) are satisfied.

16 Claims, 11 Drawing Sheets

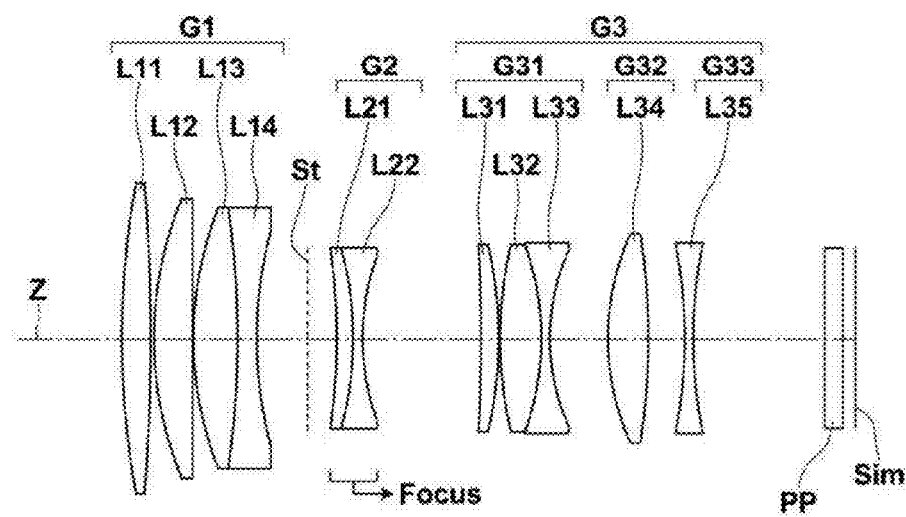
FIG.1 EXAMPLE 1
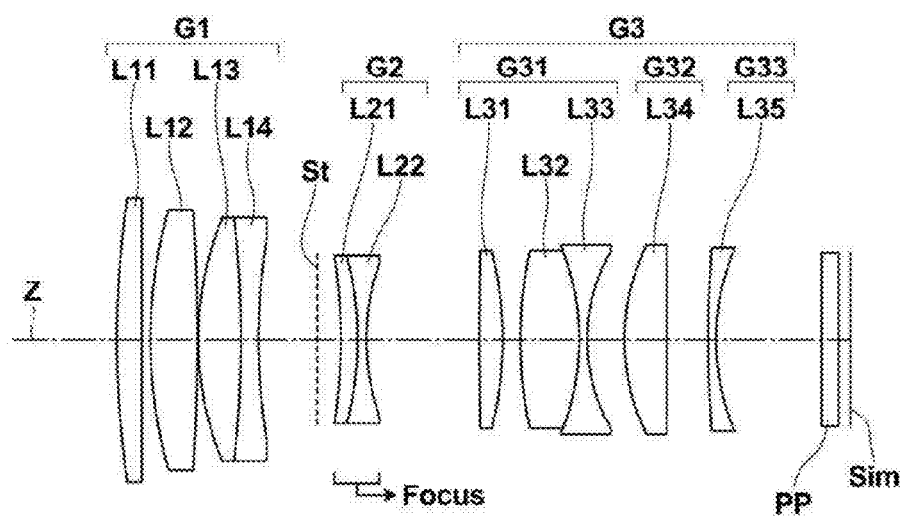
FIG.2 EXAMPLE 2

FIG.3 EXAMPLE 3
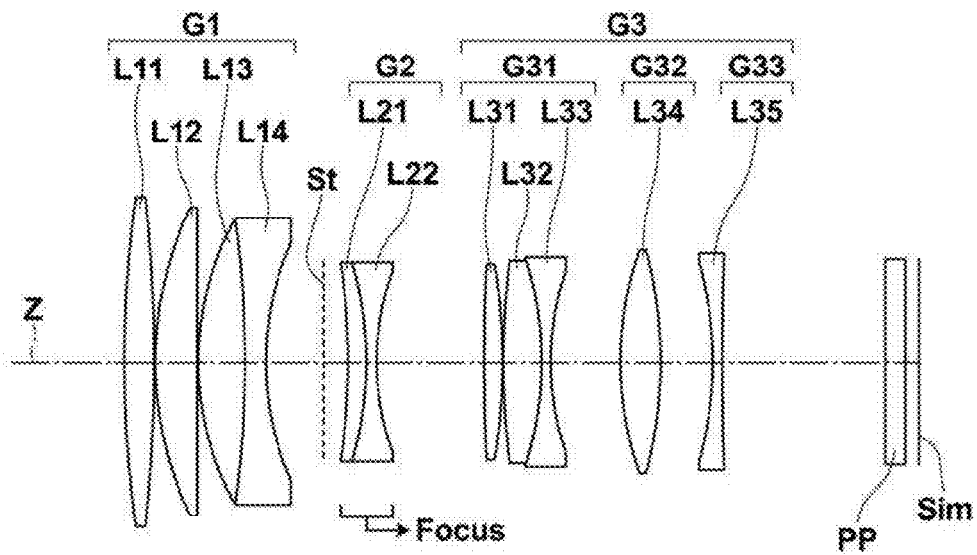
FIG.4 EXAMPLE 4
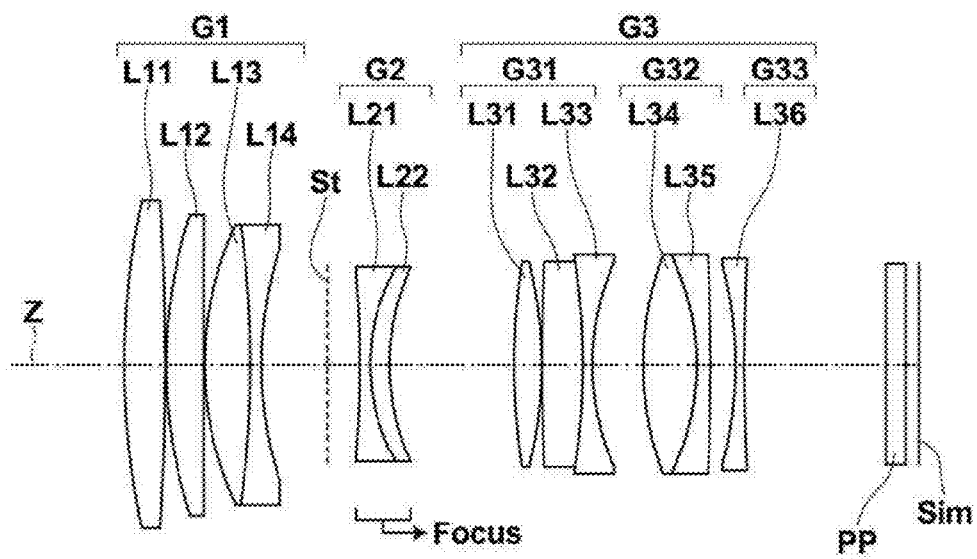

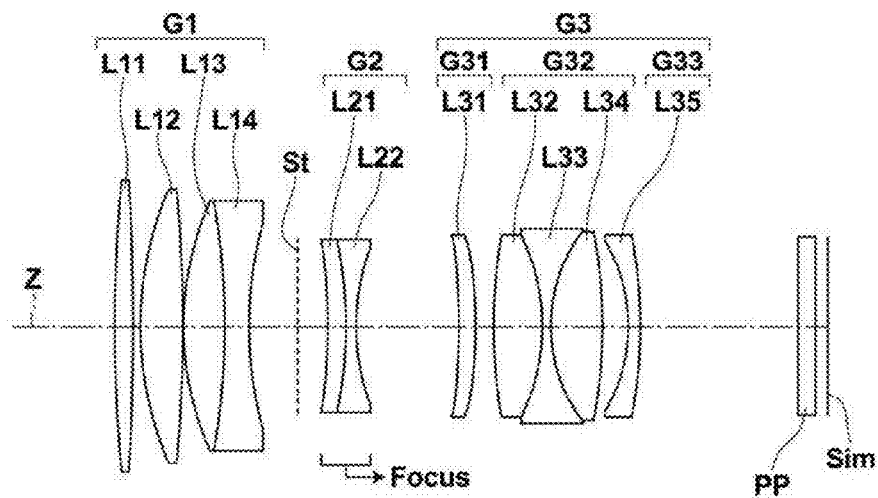
FIG.5 EXAMPLE 5
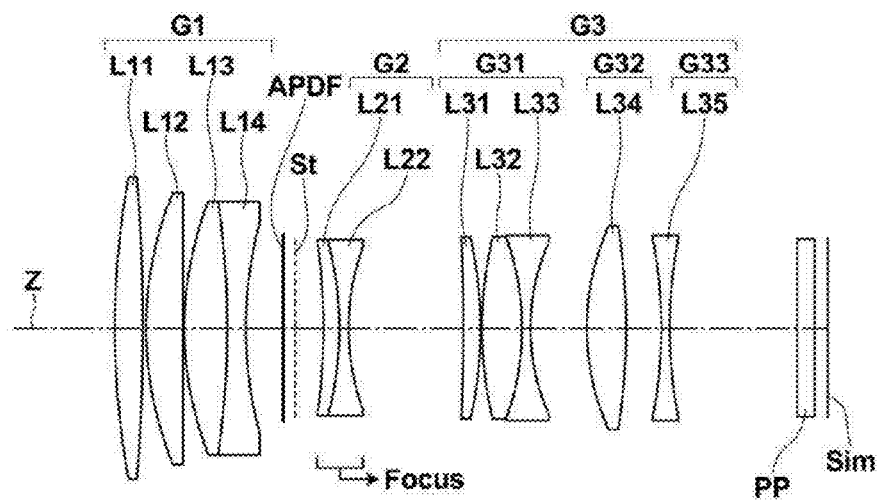
FIG.6 EXAMPLE 6

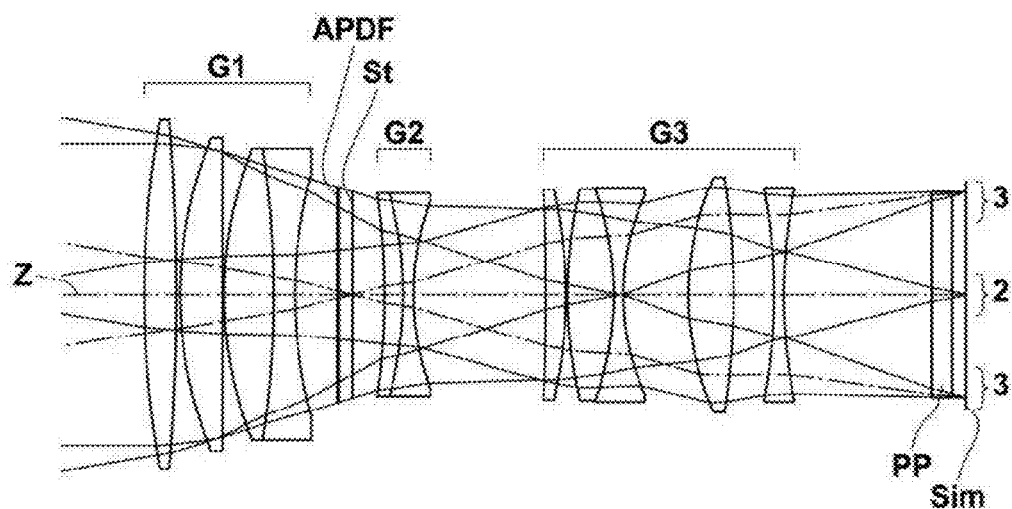
FIG.7  EXAMPLE 6

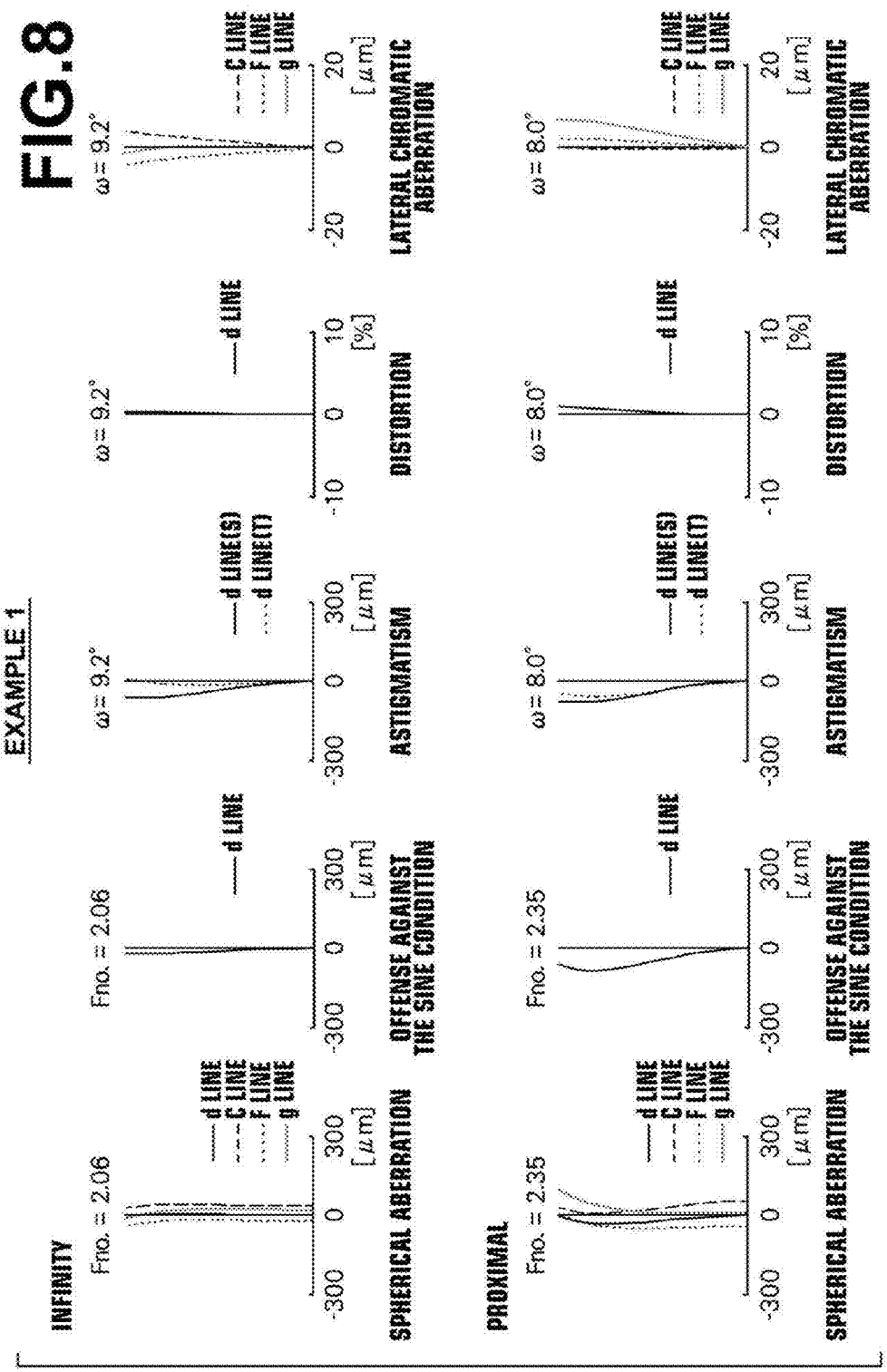

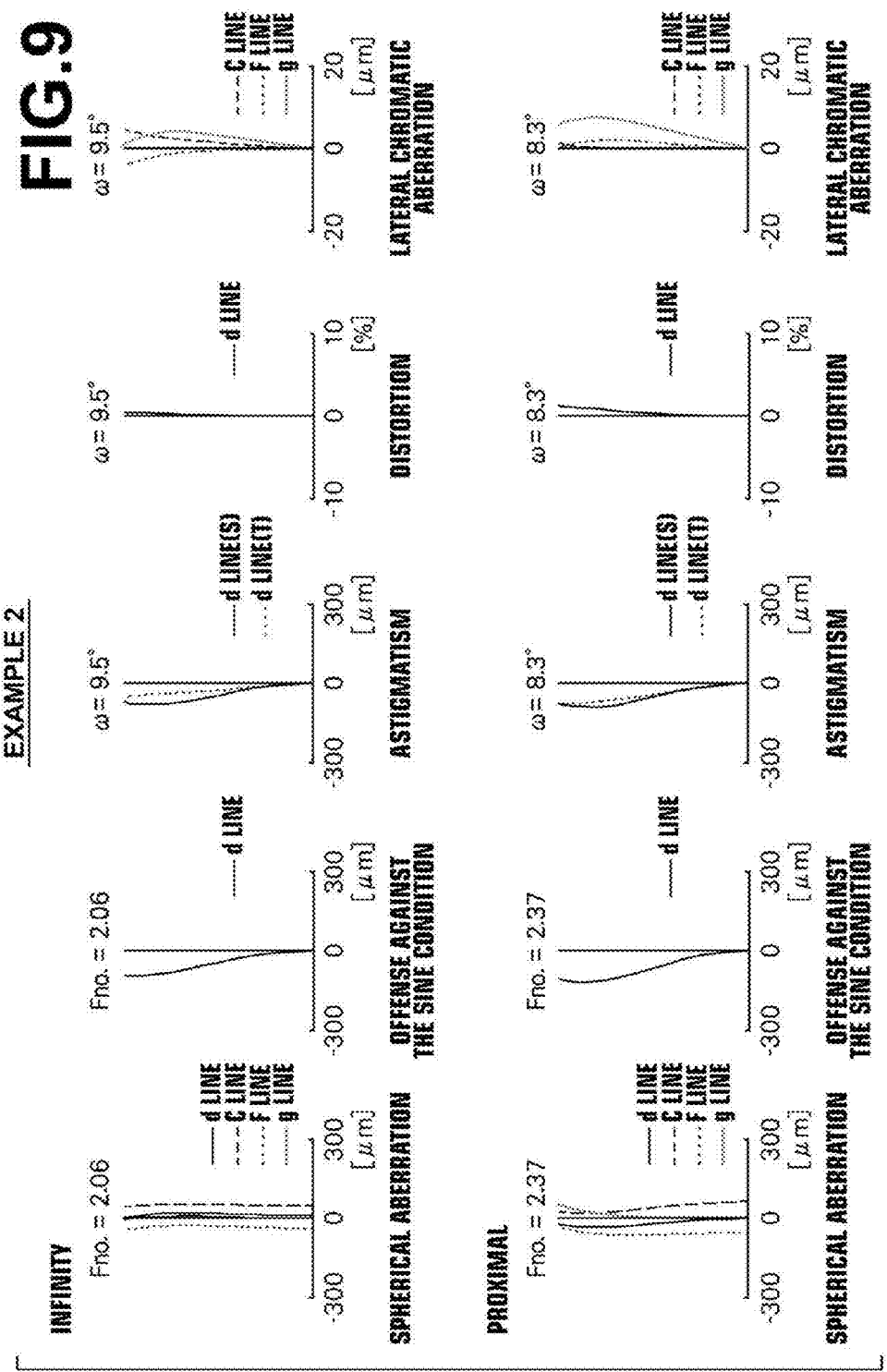

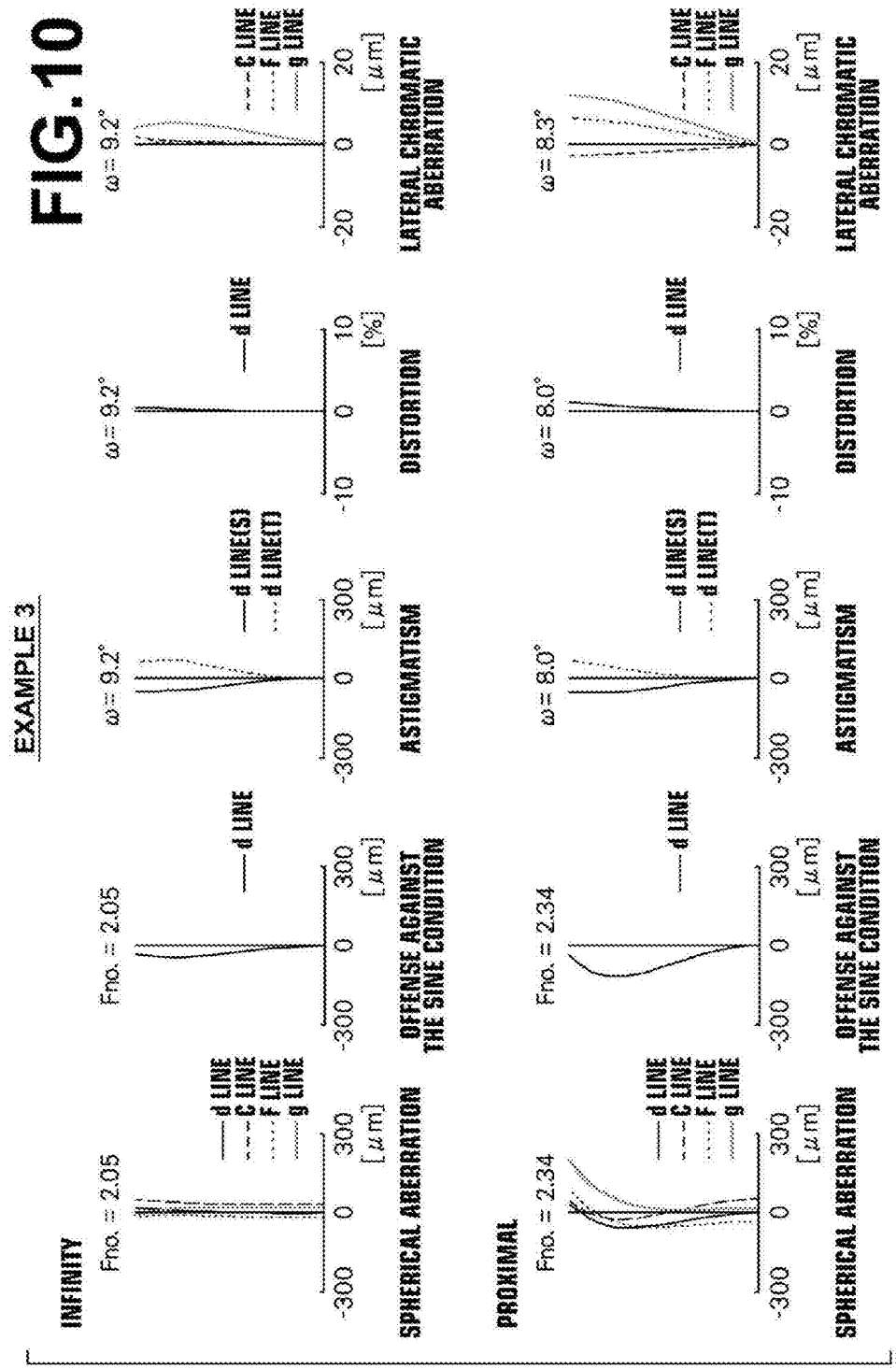

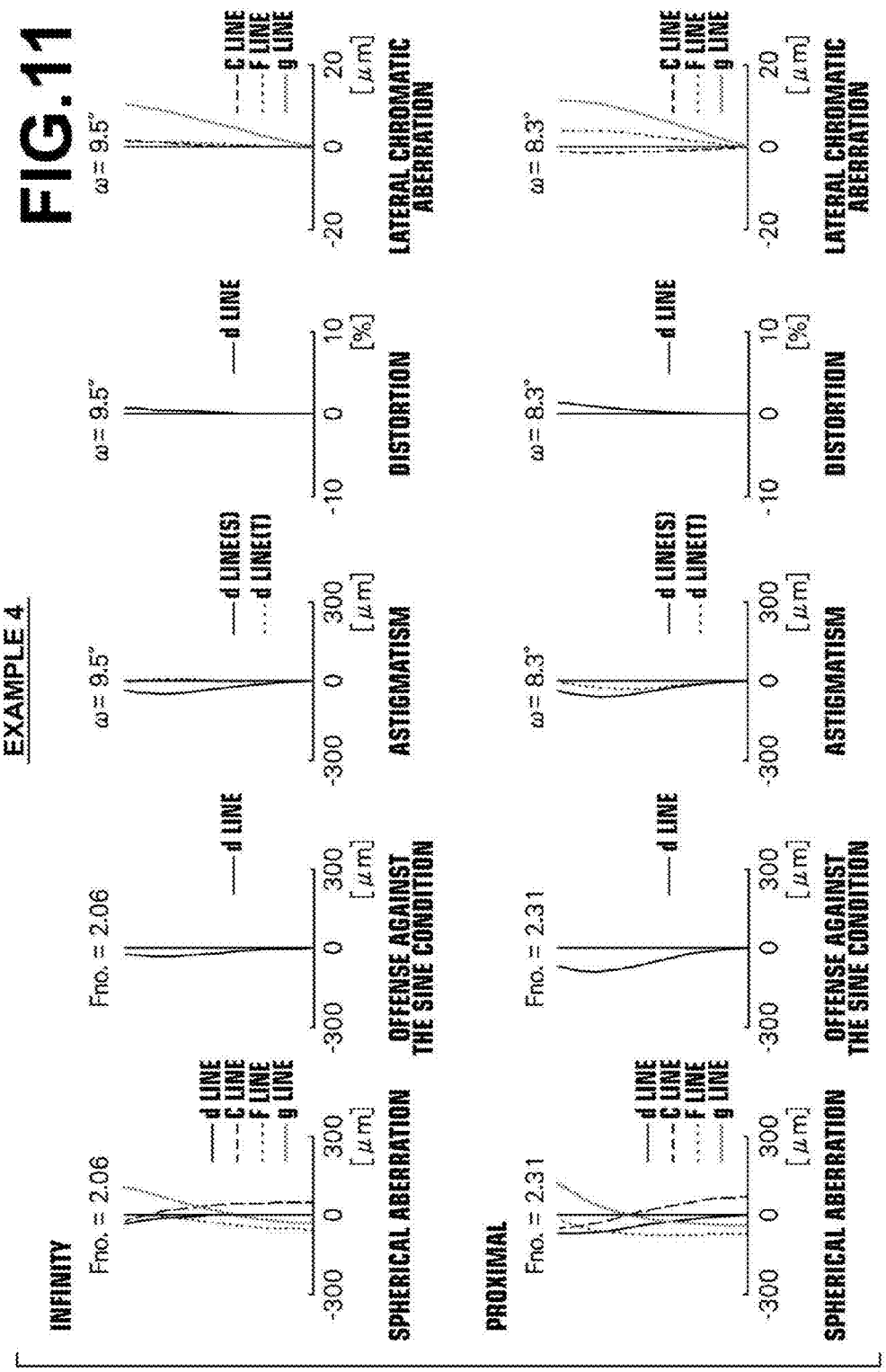

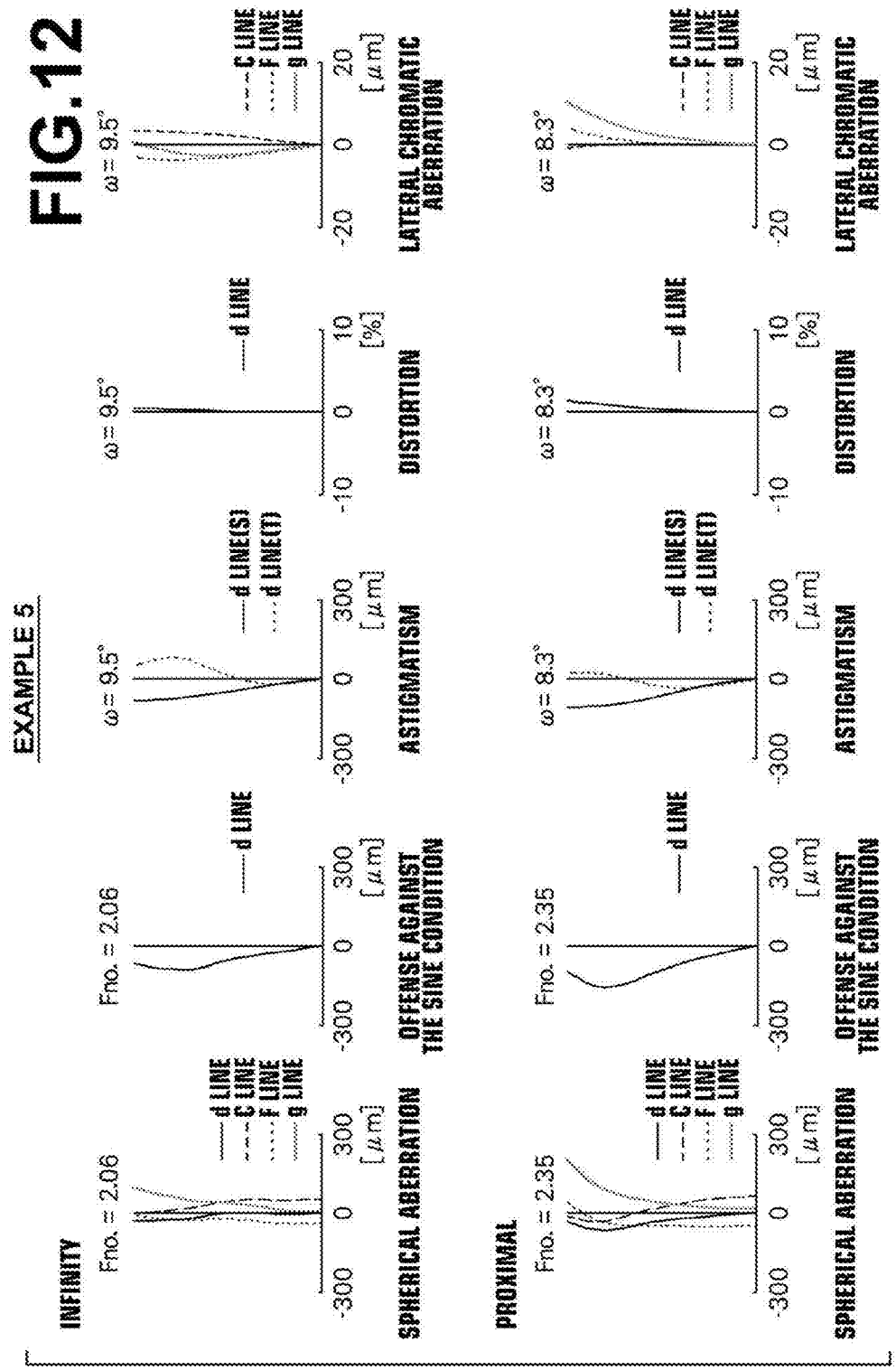

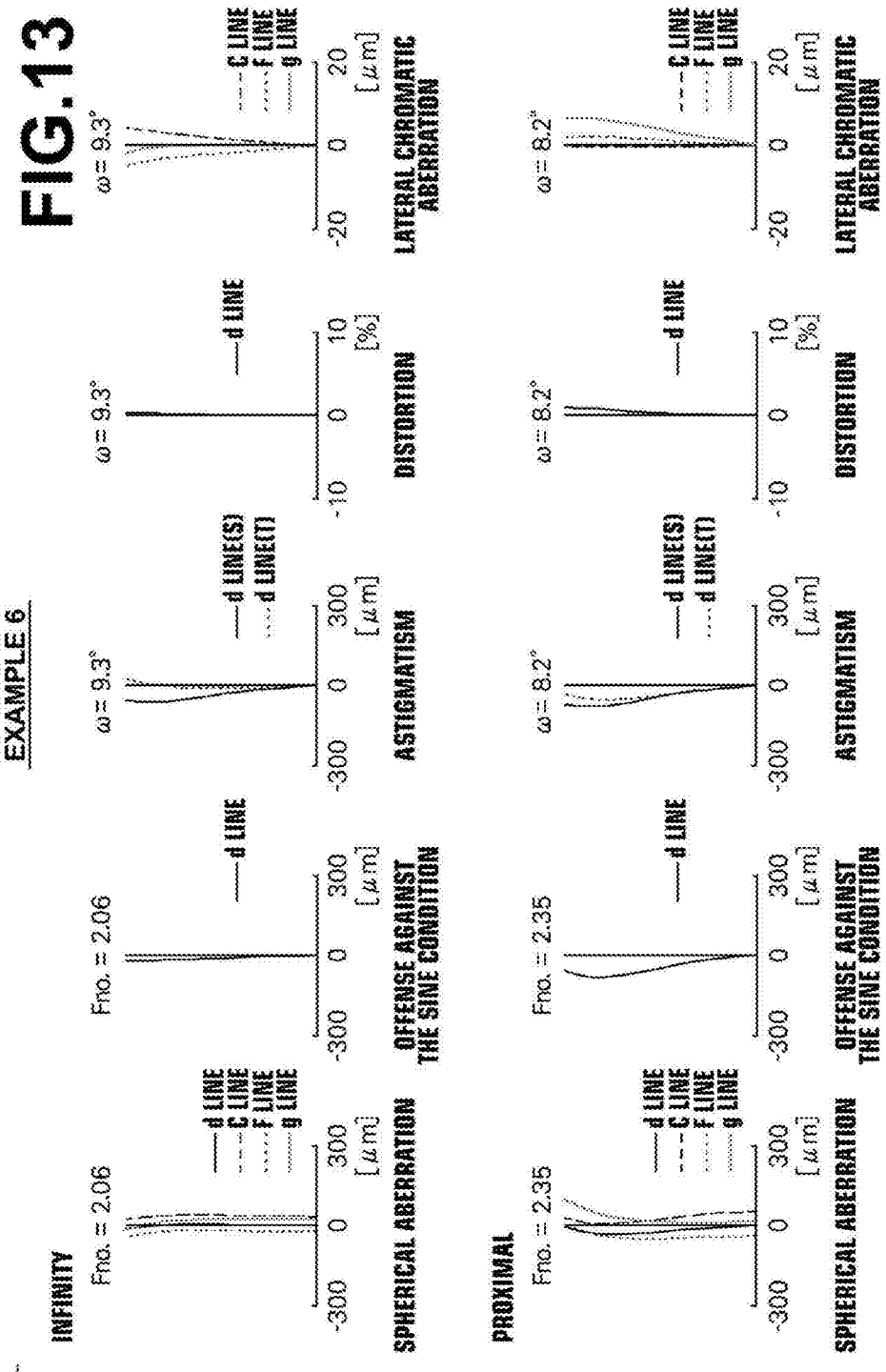

IMAGING LENS AND IMAGING APPARATUS

CROSS REFERENCE TO RELATED APPLICATIONS

The present application claims priority under 35 U.S.C. § 119 to Japanese Patent Application No. 2015-052259 filed on Mar. 16, 2015. The above application is hereby expressly incorporated by reference, in its entirety, into the present application.

BACKGROUND

The present disclosure is related to an imaging lens. More particularly, the present disclosure is related to an imaging lens which is favorably suited for use for medium telephoto imaging or telephoto imaging in imaging apparatuses such as digital cameras and the like. In addition, the present disclosure is related to an imaging apparatus equipped with such an imaging lens.

Recently, imaging lenses that adopt the inner focus method are being employed as medium telephoto imaging lenses or telephoto imaging lenses in imaging apparatuses such as digital cameras. For example, Japanese Unexamined Patent Publication Nos. 2014-139699, 2013-033178, 2013-097212, and 2012-047870 disclose imaging lenses having three group configurations constituted by a first lens group, a second lens group, and a third lens group, in which the second lens group is moved with respect to an image formation plane while the first lens group and the third lens group are fixed with respect to the image formation plane to perform focusing operations.

SUMMARY

Meanwhile, there is increasing demand for imaging lenses to be miniaturized and for fluctuations in aberrations caused by focusing operations to be reduced in imaging lenses that adopt the inner focus method.

Here, with respect to the second lens group, which is the focusing lens group that moves during focusing operations, Japanese Unexamined Patent Publication No. 2014-139699 discloses an imaging lens in which the second lens group is constituted by a single lens or two lenses, Japanese Unexamined Patent Publication No. 2013-033178 discloses an imaging lens in which the second lens group is constituted by three lenses, and Japanese Unexamined Patent Publication No. 2013-097212 discloses an imaging lens in which the second lens group is constituted by a single lens. In the imaging lenses disclosed in Japanese Unexamined Patent Publication Nos. 2014-139699, 2013-033178, and 2013-097212 there is demand for the second lens group to be miniaturized and for fluctuations in various aberrations caused by focusing operations to be suppressed.

In addition, in the imaging lens disclosed in Japanese Unexamined Patent Publication No. 2012-047870, the total length of the lens system is excessively short with respect to the focal length of the entire lens system. Such a configuration is disadvantageous from the viewpoint of miniaturizing the imaging lens by shortening the total length of the lens system while correcting various aberrations.

The present disclosure has been developed in view of the foregoing circumstances. The present disclosure provides an imaging lens having favorable optical performance that realizes miniaturization and a decrease in fluctuations in aberrations caused by focusing operations. The present disclosure also provides an imaging apparatus to which this imaging lens is applied.

A first imaging lens of the present disclosure consists of, in order from the object side to the image side:
a first lens group having a positive refractive power;
a second lens group having a negative refractive power; and
a third lens group having a positive refractive power;
the second lens group having at least one positive lens and at least one negative lens;
the second lens group moving along the optical axis from the object side to the image side while the first lens group and the third lens group are fixed with respect to an image formation plane to change focus from an object at infinity to an object at a proximal distance; and
Conditional Formulae (1) and (2) below being satisfied:

$$15 < vd\_G2p < 22 \quad (1)$$

$$1.0 < TL/f < 1.6 \quad (2)$$

wherein $vd\_G2p$ is the Abbe's number with respect to the d line of the material of the at least one positive lens within the second lens group, TL is the distance along the optical axis from the lens surface most toward the object side within the first lens group to the image formation plane with back focus as an air converted distance, and f is the focal length of the entire lens system in a state focused on an object at infinity.

A second imaging lens of the present disclosure consists of, in order from the object side to the image side:
a first lens group having a positive refractive power;
a second lens group having a negative refractive power; and
a third lens group having a positive refractive power;
the second lens group having at least one positive lens and at least one negative lens;
the entire lens system consisting of at most twelve lenses;
the second lens group moving along the optical axis from the object side to the image side while the first lens group and the third lens group are fixed with respect to an image formation plane to change focus from an object at infinity to an object at a proximal distance; and
Conditional Formula (1) below being satisfied:

$$15 < vd\_G2p < 22 \quad (1)$$

wherein $vd\_G2p$ is the Abbe's number with respect to the d line of the material of the at least one positive lens within the second lens group.

A third imaging lens of the present disclosure consists of, in order from the object side to the image side:
a first lens group having a positive refractive power;
a second lens group having a negative refractive power; and
a third lens group having a positive refractive power;
an aperture stop being positioned at the object side of the second lens group;
the second lens group having at least one positive lens and at least one negative lens;
the second lens group moving along the optical axis from the object side to the image side while the first lens group and the third lens group are fixed with respect to an image formation plane to change focus from an object at infinity to an object at a proximal distance; and
Conditional Formula (1) below being satisfied:

$$15 < vd\_G2p < 22 \quad (1)$$

wherein vd_G2p is the Abbe's number with respect to the d line of the material of the at least one positive lens within the second lens group.

In the first through third imaging lenses of the present disclosure, it is preferable for the second lens group to consist of a single positive lens and a single negative lens.

In the case that the second lens group consists of a single positive lens and a single negative lens, it is more preferable for Conditional Formula (3) below to be satisfied:

$$48 < vd\_G2n < 78 \qquad (3)$$

wherein vd_G2n is the Abbe's number with respect to the d line of the material of the negative lens within the second lens group.

In addition, it is more preferable for the second lens group to consist of a cemented lens formed by cementing a single positive lens and a single negative lens together.

In the first through third imaging lenses of the present disclosure, it is preferable for the first lens group to have at least two positive lenses, and for Conditional Formula (4) below to be satisfied:

$$58 < vd\_G1pa \qquad (4)$$

wherein vd_G1pa is the average Abbe's number with respect to the d line of the materials of the positive lenses within the first lens group.

In the first through third imaging lenses of the present disclosure, it is preferable for the first lens group to have at least two positive lenses that satisfy both of Conditional Formulae (5) and (6) below:

$$60 < vd\_G1p \qquad (5)$$

$$0.004 < \theta gF\_G1p + 0.00162 vd\_G1p - 0.6415 \qquad (6)$$

wherein vd_G1p is the Abbe's number with respect to the d line of the materials of the positive lenses within the first lens group, and θgF_G1p is the partial dispersion ratio between the g line and the F line of the positive lenses within the first lens group.

In the first through third imaging lenses of the present disclosure, it is preferable for the third lens group to have at least one positive lens that satisfies both of Conditional Formulae (7) and (8) below:

$$60 < vd\_G3p \qquad (7)$$

$$0.004 < \theta gF\_G3p + 0.00162 vd\_G3p - 0.6415 \qquad (8)$$

wherein vd_G3p is the Abbe's number with respect to the d line of the material of the at least one positive lens within the third lens group, and θgF_G3p is the partial dispersion ratio between the g line and the F line of the positive lens within the third lens group.

In the first through third imaging lenses of the present disclosure, it is preferable for the first lens group to have at least one negative lens that satisfies Conditional Formula (9) below:

$$30 < vd\_G1n < 40 \qquad (9)$$

wherein vd_G1n is the Abbe's number with respect to the d line of the material of the at least one negative lens within the first lens group.

In the first through third imaging lenses of the present disclosure, it is preferable for the first lens group to have at least three positive lenses and at least one negative lens.

In the first through third imaging lenses of the present disclosure, it is preferable for the first lens group to consist of three positive lenses and one negative lens.

In the first through third imaging lenses of the present disclosure, it is preferable for the third lens group to have at least two positive lenses and at least two negative lenses, and for the third lens group as a whole to consist of at most five lenses.

In the first through third imaging lenses of the present disclosure, it is preferable for the third lens group to have a lens component having a negative refractive power at the most image side within the third lens group.

In the first through third imaging lenses of the present disclosure, it is preferable for the third lens group to have a single lens having a negative refractive power at the most image side within the third lens group, and for the single lens to satisfy Conditional Formula (10) below:

$$40 < vd\_G3nr \qquad (10)$$

wherein vd_G3nr is the Abbe's number with respect to the d line of the single lens having a negative refractive power positioned most toward the image side within the third lens group.

In the first through third imaging lenses of the present disclosure, it is preferable for the third lens group to have a single lens having a negative refractive power at the most image side within the third lens group, and a single lens having a positive refractive power positioned adjacent to the single lens having a negative refractive power at the object side thereof.

In the first through third imaging lenses of the present disclosure, it is preferable for Conditional Formula (11) below to be satisfied:

$$0.3 < |f2|/f < 0.8 \qquad (11)$$

wherein f2 is the focal length of the second lens group, and f is the focal length of the entire lens system in a state focused on an object at infinity.

In the first through third imaging lenses of the present disclosure, it is preferable for an aperture stop to be positioned at the image side of the lens surface most toward the object side within the first lens group, and for a filter, of which the transmissivity decreases as the distance from the optical axis increases, to be positioned adjacent to the aperture stop at one of the object side and the image side thereof.

An imaging apparatus of the present disclosure is characterized by being equipped with an imaging lens of the present disclosure.

Note that the expression "consists of" above means that the imaging lens may also include lenses that practically do not have any power, optical elements other than lenses such as an aperture stop and a cover glass, and mechanical components such as lens flanges, a lens barrel, an imaging element, a camera shake correcting mechanism, etc., in addition to the constituent elements listed above.

In addition, in the imaging lenses of the present disclosure, the symbols of the refractive powers and the surface shapes of the lenses are those in the paraxial region for lenses that include aspherical surfaces.

In addition, the expression "lens component" refers to a lens having only two surfaces that contact air on the optical axis, the surface toward the object side and the surface toward the image side. One lens component refers to a single lens or a cemented lens formed by a set of lenses. In addition, the signs of the refractive powers of each lens group represent the sign of the refractive power of the lens group as a whole, and the signs of the refractive powers of each cemented lens represent the sign of the refractive power of the cemented lens as a whole.

In addition, the partial dispersion ratio θgF is represented by the formula below:

θgF=(ng−nF)/(nF−nC)

wherein ng is the refractive index with respect to the g line (wavelength: 435.8 nm), nF is the refractive index with respect to the F line (wavelength: 486.1 nm), and nC is the refractive index with respect to the C line (wavelength: 656.3 nm).

The imaging lenses of the present disclosure are constituted by the first lens group having a positive refractive power, the second lens group having a negative refractive power, and the third lens group having a positive refractive power. The second lens group has at least one positive lens and at least one negative lens. The lens configurations of the first lens group through the third lens group are favorably set. Therefore, the imaging lenses can realize miniaturization and a decrease in fluctuations in aberrations caused by focusing operations, as well as high optical performance.

The imaging apparatus of the present disclosure is equipped with an imaging lens of the present disclosure. Therefore, the imaging apparatus can be configured to be compact, and is capable of obtaining favorably images having high resolution, in which various aberrations are corrected.

BRIEF DESCRIPTION OF THE DRAWINGS

FIG. 1 is a sectional diagram that illustrates the lens configuration of an imaging lens according to Example 1 of the present disclosure.

FIG. 2 is a sectional diagram that illustrates the lens configuration of an imaging lens according to Example 2 of the present disclosure.

FIG. 3 is a sectional diagram that illustrates the lens configuration of an imaging lens according to Example 3 of the present disclosure.

FIG. 4 is a sectional diagram that illustrates the lens configuration of an imaging lens according to Example 4 of the present disclosure.

FIG. 5 is a sectional diagram that illustrates the lens configuration of an imaging lens according to Example 5 of the present disclosure.

FIG. 6 is a sectional diagram that illustrates the lens configuration of an imaging lens according to Example 6 of the present disclosure.

FIG. 7 is a sectional diagram that illustrates the paths of light rays that pass through the imaging lens according to Example 6 of the present disclosure.

FIG. 8 is a collection of diagrams that illustrate various aberrations of the imaging lens according to Example 1, which are spherical aberration, offense against the sine condition, astigmatism, distortion, and lateral chromatic aberration in this order from the left side of the drawing sheet.

FIG. 9 is a collection of diagrams that illustrate various aberrations of the imaging lens according to Example 2, which are spherical aberration, offense against the sine condition, astigmatism, distortion, and lateral chromatic aberration in this order from the left side of the drawing sheet.

FIG. 10 is a collection of diagrams that illustrate various aberrations of the imaging lens according to Example 3, which are spherical aberration, offense against the sine condition, astigmatism, distortion, and lateral chromatic aberration in this order from the left side of the drawing sheet.

FIG. 11 is a collection of diagrams that illustrate various aberrations of the imaging lens according to Example 4, which are spherical aberration, offense against the sine condition, astigmatism, distortion, and lateral chromatic aberration in this order from the left side of the drawing sheet.

FIG. 12 is a collection of diagrams that illustrate various aberrations of the imaging lens according to Example 5, which are spherical aberration, offense against the sine condition, astigmatism, distortion, and lateral chromatic aberration in this order from the left side of the drawing sheet.

FIG. 13 is a collection of diagrams that illustrate various aberrations of the imaging lens according to Example 6, which are spherical aberration, offense against the sine condition, astigmatism, distortion, and lateral chromatic aberration in this order from the left side of the drawing sheet.

DETAILED DESCRIPTION OF THE PREFERRED EMBODIMENTS

Figure 14A:
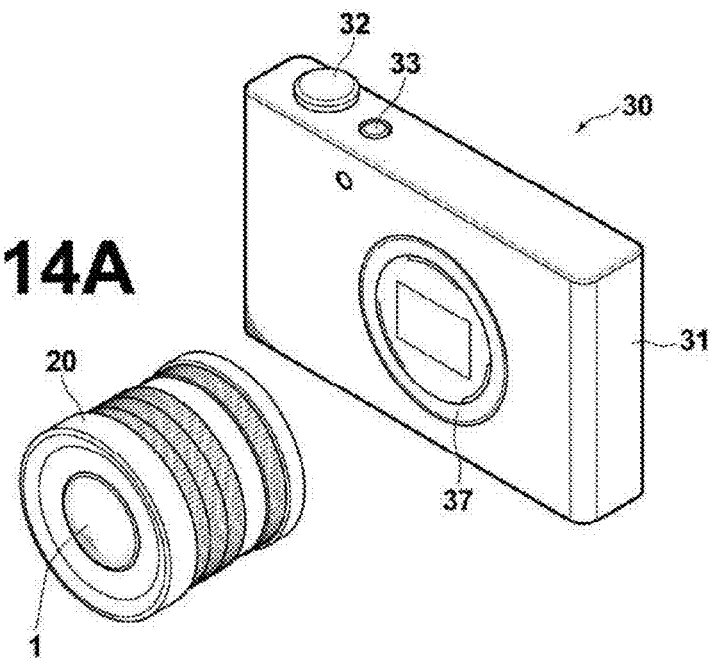
FIG. 14A is a perspective view that illustrates the front side of an imaging apparatus according to an embodiment of the present disclosure.

Hereinafter, embodiments of the present disclosure will be described in detail with reference to the attached drawings. FIG. 1 is a cross sectional diagram that illustrate the configurations of an imaging lens according to an embodiment of the present disclosure that corresponds to an imaging lens of Example 1 to be described later. In addition, FIG. 2 through FIG. 6 are cross sectional diagrams that illustrate other examples of configurations according to embodiments of the present disclosure, and respectively correspond to imaging lenses of Examples 2 through 6 to be described later. The basic configurations of the Examples illustrated in FIG. 1 through FIG. 6 are the same other than the numbers of lenses that constitute three lens groups, and the manners in which the configurations are illustrated are the same. Therefore, the imaging lenses according to the embodiments of the present disclosure will be described mainly with reference to FIG. 1.

FIG. 1 illustrates the arrangement of the optical system in a state focused on an object at infinity, with the left side as the object side and the right side as the image side. The same applies to FIG. 2 through FIG. 6 to be described later. In addition, FIG. 7 is a cross sectional diagram that illustrates the paths of an axial light beam 2 from an object at infinity and a light beam 3 at a maximum angle of view that pass through the imaging lens according to Example 6.

The imaging lens 1 of the present embodiment is constituted by: a first lens group G1 having a positive refractive power, a second lens group G2 having a negative refractive power, and a third lens group G3 having a positive refractive power, as lens groups provided in order from the object side to the image side. In the example illustrated in FIG. 1, the first lens group G1 is constituted by four lenses, which are lenses L11 through L14, provided in this order from the object side. The second lens group G2 is constituted by two lenses, which are a lens L21 and a lens L22, provided in this order from the object side. The third lens group G3 is constituted by five lenses, which are lenses L31 through L35, provided in this order from the object side.

The imaging lens is a fixed focal point type optical system that employs the inner focus method, in which the second lens group G2 is moved along an optical axis Z from the object side to the image side while the first lens group G1 and the third lens group G3 are fixed with respect to an image formation plane Sim, to change focus from an object at infinity to an object at a proximal distance. By configuring the imaging lens 1 such that only the second lens group G2 is moved during focusing operations, a focusing unit that moves components during focusing operations can be formed to be compact and lightweight. Such a configuration is advantageous from the viewpoints of decreasing load on a drive system and increasing the speed of focusing operations. In addition, the first lens group G1 and the third lens group G3 are fixed with respect to the image formation plane Sim. As a result, superior dust preventing properties can be secured.

In addition, it is preferable for the imaging lens 1 to be equipped with an aperture stop St which is positioned at the object side of the second lens group G2, which is the focusing lens group. By positioning the aperture stop St at the object side of the second lens group G2 in this manner, the diameters of the lenses within the first lens group G1 and the second lens group G2 can be decreased. In addition, such a configuration facilitates securing space for movement of the second lens group G2 in the direction of the optical axis during focusing operations. Therefore, this configuration is advantageous from the viewpoint of shortening the most proximal imaging distance. In addition, the imaging lens 1 consists of, in order from the object side to the image side: the first lens group G1 having a positive refractive power, the second lens group G2 having a negative refractive power, and the third lens group G3 having a positive refractive power, and the aperture stop St is positioned at the object side of the second lens group G2. By adopting this configuration, distortion can be favorably corrected.

Note that the aperture stop St illustrated in FIG. 1 does not necessarily represent the size or the shape thereof, but the position thereof along the optical axis Z. In addition, Sim illustrated in FIG. 1 is the image formation plane. An imaging element such as a CCD (Charge Coupled Device) and a CMOS (Complementary Metal Oxide Semiconductor) is provided at this position as will be described later.

In addition, it is preferable for the aperture stop St to be positioned between the lens surface most toward the image side within the first lens group G1 and the lens surface most toward the object side within the second lens group G2, and to be fixed with respect to the image formation plane Sim during focusing operations. In this case, the aperture stop St will not be moved with respect to the image formation plane Sim during focusing operations, and the focusing unit for moving components during focusing operations can be formed to be compact and lightweight. Such a configuration is advantageous from the viewpoints of decreasing load on a drive system can be reduced and increasing the speed of focusing operations. In addition, this configuration can simplify the configuration of a lens holding frame of the first lens group G1 compared to a case in which the aperture stop St is positioned between the lens surface most toward the object side within the first lens group G1 and the lens surface most toward the image side within the first lens group G1, and can suppress the generation of eccentricities among each of the lenses which are included in the first lens group G1.

The first lens group G1 has a positive refractive power as a whole. In addition, the first lens group G1 is configured to have at least two positive lenses and at least one negative lens. By the first lens group being configured in this manner, miniaturization of the imaging lens 1 can be achieved, while spherical aberration and longitudinal chromatic aberration can be favorably corrected.

It is preferable for the first lens group G1 to have at least three positive lenses and at least one negative lens. In this case, the refractive power of each of the positive lenses can be prevented from becoming excessively strong because the first lens group G1 has at least three positive lenses, which is advantageous from the viewpoints of correcting spherical aberration and comatic aberration. In addition, the first lens group G1 has at least one negative lens. This configuration is advantageous from the viewpoints of correcting spherical aberration and longitudinal chromatic aberration.

Further, it is more preferable for the first lens group G1 to consist of three positive lenses and one negative lens. By the first lens group G1 being of a four lens configuration constituted by three positive lenses and one negative lens, aberrations can be favorably corrected and optical performance can be secured, while suppressing increases in the diameters and the thicknesses in the direction of the optical axis of each lens which is included in the first lens group G1, compared to a case in which the number of lenses which are included in the first lens group G1 is increased further.

Further, it is even more preferable for the first lens group G1 to consist of, in order from the object side to the image side: a positive lens L11, a positive lens L12, a positive lens L13, and a negative lens L14. In this case, a light beam converging effect can be increased compared to a case in which three positive lenses L11 through L13 are continuously positioned in order from the object side to the image side. In addition, by distributing the positive refractive power of the first lens group G1 among the three positive lenses L11 through L13, the positive refractive powers of each of the positive lenses can be prevented from becoming excessively strong. In addition, by positioning one negative lens L14 most toward the image side within the first lens group G1, spherical aberration, comatic aberration, and chromatic aberration can be favorably corrected.

The second lens group G2 has a negative refractive power as a whole. In addition, the second lens group G2 has at least one positive lens and at least one negative lens. For this reason, fluctuations in chromatic aberration caused by focusing operations can be favorably suppressed. In addition, it is preferable for the second lens group G2 to consist of one positive lens and one negative lens. In this case, fluctuations in chromatic aberration caused by focusing operations can be favorably suppressed, while achieving miniaturization and weight reduction of the second lens group. As a result, this configuration is advantageous from the viewpoints of decreasing load on a drive system and increasing the speed of focusing operations. In order to obtain these advantageous effects, the second lens group G2 may be constituted by, in order from the object side to the image side, a positive lens and a negative lens, or constituted by, in order from the object side to the image side, a negative lens and a positive lens.

Further, it is preferable for the second lens group G2 to be constituted by one cemented lens formed by cementing one positive lens and one negative lens together. In this case, chromatic aberration can be favorably corrected. In addition, in the case that the second lens group G2 is constituted by one cemented lens, the configuration of a lens holding frame of the second lens group G2 can be simplified, which is advantageous from the viewpoint of reducing the weight of a focusing unit. In addition, the cemented lens that constitutes the second lens group G2 may be a cemented lens formed by cementing a positive lens and a negative lens, provided in this order from the object side to the image side, together, or a cemented lens formed by cementing a negative lens and a positive lens, provided in this order from the object side to the image side, together.

The third lens group G3 has a positive refractive power as a whole. In addition, it is preferable for the third lens group G3 to have at least two positive lenses and at least two negative lenses. In the case that the third lens group G3 has at least two negative lenses, it will be possible to position the at least two negative lenses at different positions along the optical axis. For this reason, axial aberrations and off axis aberrations can be corrected with favorable balance. In addition, by positioning at least two positive lenses having positive refractive powers at different positions along the optical axis, axial aberrations can be corrected at positions where the difference between the heights of axial light rays and the heights of off axis light rays is relatively small, while off axis aberrations can be corrected at positions where the difference between the heights of axial light rays and the heights of off axis light rays is relatively great. Therefore, axial aberrations and off axis aberrations can be corrected with favorable balance.

Here, the third lens group G3 is positioned more toward the image side than the second lens group G2, which is the focusing lens group. Therefore, the third lens group G3 is at a position remote from the aperture stop St. It is preferable for the third lens group G3 to include at least one cemented lens. In addition, in the case that the third lens group G3 has at least two positive lenses and at least two negative lenses that include at least one cemented lens, various axial aberrations and various off axis aberrations such as distortion can be favorably corrected at the third lens group G3, even in a state in which the third lens group G3 is provided at a position remote from the aperture stop St.

Further, it is preferable for the third lens group G3 to have at least two positive lenses and at least two negative lenses, and for the third lens group G3 as a whole to consist of at most five lenses. In this case, axial aberrations and off axis aberrations such as distortion can be favorably corrected, while realizing miniaturization, weight reduction, and cost reduction. Note that the imaging lenses illustrated in FIGS. 1 through 3, 5, and 6 are examples of configurations in which the third lens group G3 has at least two positive lenses and at least two negative lenses, and consists of at most five lenses as a whole.

For example, the cemented lens which is included in the third lens group G3 may be a cemented lens having a two lens configuration in which two adjacent lenses are cemented together, or a cemented lens having a three lens configuration in which three adjacent lenses are cemented together in order in the direction of the optical axis. In addition, it is preferable for the cemented lens which is included in the third lens group G3 to be a cemented lens that includes at least one positive lens and at least one negative lens.

In the imaging lens 1, it is preferable for the third lens group G3 to have a lens component having a negative refractive power provided most toward the image side within the third lens group G3. In this case, off axis light rays can be directed in a direction away from the optical axis, and the total length of the lens system can be shortened. In addition, it is more preferable for the third lens group G3 to have a single lens having a negative refractive power provided most toward the image side within the third lens group G3. In this case, securing a negative refractive power at the most image side within the third lens group G3 is facilitated, and the length of the third lens group G3 along the optical axis can be more favorably shortened. In addition, the third lens group can be formed to be more compact and lightweight.

It is preferable for the third lens group G3 to have a single lens having a negative refractive power at the most image side within the third lens group, and a single lens having a positive refractive power positioned adjacent to the single lens having a negative refractive power at the object side thereof. In this case, off axis aberrations, particularly field curvature can be favorably corrected.

The third lens group G3 may consist of, in order from the object side to the image side, a third-group first lens group G31 having a positive refractive power, a third-group second lens group G32 having a positive refractive power, and a third-group third lens group G33 having a negative refractive power. Note that in this case, the third-group first lens group G31 and the third-group second lens group G32 are separated by one of the largest and the second largest air distances along the optical axis from among the air distances among adjacent lenses within the third lens group G3, and the third-group second lens group G32 and the third-group third lens group G33 are separated by the other of the largest and the second largest air distances.

The third lens group G3 has, in order from the object side to the image side, the third-group first lens group G31 having a positive refractive power and the third-group second lens group G32 having a positive refractive power. Therefore, positive refractive power necessary to miniaturize the third lens group G3 can be increased, while the positive refractive power is distributed between two lens groups, in order to enable favorable correction of aberrations. In addition, by positioning the third-group first lens group G31 having a positive refractive power and the third-group second lens group G32 having a positive refractive power in this order from the object side to the image side, axial aberrations can be corrected at positions where the difference between the heights of axial light rays and the heights of off axis light rays is relatively small, while off axis aberrations can be corrected at positions where the difference between the heights of axial light rays and the heights of off axis light rays is relatively great. Therefore, axial aberrations and off axis aberrations can be corrected with favorable balance. In addition, the third lens group G3 has the third-group third lens group G33 having a negative refractive power provided most toward the image side therein. Therefore, off axis light rays can be directed in a direction away from the optical axis, and the total length of the lens system can be shortened.

In addition, in the case that the third lens group G3 consists of the third-group first lens group G31, the third-group second lens group G32, and the third-group third lens group G33, it is preferable for the third-group first lens group G31 to have at least one cemented lens. Chromatic aberrations can be favorably corrected, by the third-group first lens group G31 having at least one cemented lens. For example, the cemented lens included in the third-group first lens group G31 may be a cemented lens formed by cementing one positive lens and one negative lens together.

In addition, it is preferable for the third-group second lens group G32 to consist of one lens component that has a positive refractive power. In this case, miniaturization of the third-group second lens group G32 can be achieved. Further, in the case that the third-group second lens group G32 consists of one lens component that has a positive refractive power, a securing a necessary amount of positive refractive power is facilitated, and the third lens group G3 can be formed to be more compact and lightweight.

In addition, it is preferable for the third-group third lens group G33 to consist of one lens component that has a negative refractive power. In this case, miniaturization of the third-group third lens group G33 can be achieved. Further, it is more preferable for the third-group third lens group G33 to consist of one single lens having a negative refractive power. In this case, the lens provided most toward the image side within the third lens group G3 will be a single lens. As a result, securing negative refractive power at the most image side of the third lens group G3 will be facilitated, and the length along the optical axis of the third lens group G3 can be more favorably shortened. In addition, the third lens group G3 can be formed to be more compact and lightweight.

The imaging lenses illustrated in FIGS. 1 through 3 and 6 are examples of configurations in which the third-group first lens group G31 has a cemented lens formed by cementing a lens L32 and a lens L33 together, the third-group second lens group G32 is constituted by one positive lens L34, and the third-group third lens group G33 is constituted by one negative lens L35.

In addition, FIG. 1 illustrates an example in which a parallel plate shaped optical member PP is provided between the third lens group G3 and the image formation plane Sim. When an imaging lens is applied to an imaging apparatus, it is often the case that a cover glass and various types of filters, such as an infrared cutoff filter and a low pass filter, are provided between the imaging lens and the image formation plane Sim. The optical member PP assumes the presence of such elements.

Although not illustrated in FIG. 1, the imaging lens 1 may further be equipped with a so called APD filter (Apodization Filter), of which the transmissivity decreases as the distance from the optical axis increases. In this case, it is preferable for the aperture stop St to be positioned at the image side of the lens surface most toward the object side within the first lens group G1, and for the APD filter APDF to be provided adjacent to the aperture stop St at the object side or the image side thereof. By positioning the APD filter APDF adjacent to the aperture stop St, the amount of light that passes through the APD filter can be decreased depending on distances from the optical axis at a position in the vicinity of the aperture stop St. This configuration contributes to the formation of smooth blurred images. Note that FIG. 6 illustrates an example of a configuration equipped with the APD filter APDF, having the same basic lens configuration as the imaging lens 1 of FIG. 1.

In addition, the imaging lens 1 may be of a configuration in which the APD filter APDF is always included, or a configuration in which the APD filter APDF is removably provided. In the case that the imaging lens 1 is of a configuration in which the APD filter APDF is removably provided, it is necessary to correct the focus position prior to and following insertion and removal of the APD filter APDF. Correction of the focus position may be performed by moving the imaging lens 1 relative to the image formation plane Sim. However, it is simpler to correct the focus position by moving the second lens group G2, which is the focusing lens group, and therefore adopting this configuration is more preferable.

In addition, it is preferable for the configurations of the imaging lens 1 to be generalized as much as possible regardless of the presence of the APD filter APDF, from the viewpoint of productivity. Similarly, it is preferable for other components, such as mechanical components, of the imaging apparatus equipped with the imaging lens 1 to be generalized as much as possible regardless of the presence of the APD filter APDF. In order to generalize the configurations of the imaging lens 1 or the imaging apparatus in this manner, it is necessary to correct the focus position prior to and after insertion and removal of the APD filter APDF. When correcting the focus position, it is preferable for correction of the focus position to be performed by moving the second lens group G2 in the case that there is sufficient space to move the second lens group G2 along the optical axis for focusing operations and the displacement of the focus position is small. Alternatively, in the case that its is not possible to correct the focus position by movement of the second lens group G2 or in the case that fluctuations in aberrations which are caused by inserting the APD filter APDF are great, correcting the focus position by changing a portion of the lens configuration of the imaging lens 1 may be considered.

It is preferable for the imaging lens to consist of at most twelve lenses. In this case, miniaturization and a reduction in weight of the imaging lens 1 can be realized.

The imaging lens 1 of the present embodiment consists of, in order from the object side to the image side: the first lens group G1 having a positive refractive power, the second lens group G2 having a negative refractive power, and the third lens group G3 having a positive refractive power. The lens configurations of the first lens group G1 through the third lens group G3 are favorably set. Therefore, miniaturization of the first lens group G1, miniaturization of the second lens group G2, which is the focusing lens group, a decrease in fluctuations in aberrations caused by focusing operations, and high optical performance can be realized.

The imaging lens 1 is of the configuration described above. In addition, Conditional Formula (1) below is satisfied.

$$15 < vd\_G2p < 22 \tag{1}$$

wherein $vd\_G2p$ is the Abbe's number with respect to the d line of the material of the at least one positive lens within the second lens group G2.

Conditional Formula (1) defines the preferable range for the material of the positive lenses within the second lens group G2 having a negative refractive power. By configuring the imaging lens 1 such that the value of $vd\_G2p$ is not less than or equal to the lower limit defined in Conditional Formula (1), the generation of secondary order chromatic aberration can be favorably suppressed. By configuring the imaging lens 1 such that the value of $vd\_G2p$ is not greater than or equal to the upper limit defined in Conditional Formula (1), fluctuations in chromatic aberrations caused by focusing operations can be favorably suppressed, and particularly fluctuations in lateral chromatic aberration caused by focusing operations, can be suppressed. For this reason, the positive lenses within the second lens group G2 having a negative refractive power can be formed by a high dispersion material within an appropriate range by satisfying Conditional Formula (1), and chromatic aberrations can be favorably corrected. It is preferable for Conditional Formula (1-1) below to be satisfied, in order to cause these advantageous effects to become more prominent.

$$16 < vd\_G2p < 21 \tag{1-1}$$

In addition, in the imaging lens 1, it is preferable for Conditional Formula (2) below to be satisfied.

$$1.0 < TL/f < 1.6 \tag{2}$$

wherein TL is the distance along the optical axis from the lens surface most toward the object side within the first lens group G1 to the image formation plane with back focus as an air converted distance, and f is the focal length of the entire lens system in a state focused on an object at infinity.

By configuring the imaging lens 1 such that the value of TL/f is not less than or equal to the lower limit defined in Conditional Formula (2), it will become possible to favorably correct various aberrations. By configuring the imaging lens 1 such that the value of TL/f is not greater than or equal to the upper limit defined in Conditional Formula (2), the total length of the imaging lens 1 can be shortened. Therefore, satisfying Conditional Formula (2) is advantageous from the viewpoint of improving the portability of an imaging apparatus equipped with the imaging lens 1. It is more preferable for Conditional Formula (2-1) below to be satisfied, in order to cause the advantageous effects obtained by satisfying Conditional Formula (2) to become more prominent.

$$1.15 < TL/f < 1.50 \tag{2-1}$$

In addition, it is preferable for the second lens group G2 to consist of a single positive lens and a single negative lens, and for Conditional Formula (3) below to be satisfied:

$$48 < vd\_G2n < 78 \tag{3}$$

wherein $vd\_G2n$ is the Abbe's number with respect to the d line of the material of the negative lens within the second lens group G2.

By Conditional Formula (3) being satisfied, the negative lens which is included in the second lens group G2 having a negative refractive power can be formed by a high dispersion material within an appropriate range, and longitudinal chromatic aberration and lateral chromatic aberration can be corrected with favorable balance. In addition, fluctuations in chromatic aberrations caused by focusing operations can be suppressed. It is more preferable for Conditional Formula (3-1) below to be satisfied, in order to cause these advantageous effects to become more prominent.

$$49 < vd\_G2n < 76 \tag{3-1}$$

In the imaging lens 1, it is preferable for the first lens group G1 to have at least two positive lenses, and for Conditional Formula (4) below to be satisfied:

$$58 < vd\_G1pa \tag{4}$$

wherein $vd\_G1pa$ is the average Abbe's number with respect to the d line of the materials of the positive lenses within the first lens group G1.

In order to favorably correct chromatic aberrations and other various aberrations, it is preferable for the positive lenses within the first lens group G1, through which the diameter of axial light beams is the greatest, to be formed by a low dispersion material. By configuring the imaging lens 1 such that the value of $vd\_G1pa$ is not less than or equal to the lower limit defined in Conditional Formula (4), longitudinal chromatic aberration can be favorably corrected. It is more preferable for the value of $vd\_G1pa$ to be not less than or equal to the lower limit defined in Conditional Formula (4-1), in order to cause this advantageous effect to become more prominent. In addition, by configuring the imaging lens 1 such that the value of $vd\_G1pa$ is not greater than or equal to the upper limit defined in Conditional Formula (4-1), a necessary refractive index can be secured, and this configuration is advantageous from the viewpoint of favorably correcting various aberrations, such as spherical aberration.

$$60 < vd\_G1pa < 100 \tag{4-1}$$

In the imaging lens 1, it is preferable for the first lens group G1 to have at least two positive lenses that satisfy both of Conditional Formulae (5) and (6) below:

$$60 < vd\_G1p \tag{5}$$

$$0.004 < \theta gF\_G1p + 0.00162 vd\_G1p - 0.6415 \tag{6}$$

wherein $vd\_G1p$ is the Abbe's number with respect to the d line of the materials of the positive lenses within the first lens group G1, and $\theta gF\_G1p$ is the partial dispersion ratio between the g line and the F line of the positive lenses within the first lens group G1.

Conditional Formula (5) is related to the Abbe's numbers of the positive lenses included within the first lens group G1, and Conditional Formula (6) is related to the partial dispersion ratio between the g line and the F line of the positive lenses within the first lens group G1. By configuring the imaging lens 1 such that the value of $vd\_G1p$ is not less than or equal to the lower limit defined in Conditional Formula (5) and such that the value of $\theta gF\_G1p + 0.00162 vd\_G1p - 0.6415$ is not less than or equal to the lower limit defined in Conditional Formula (6), the low dispersion properties indicated by Conditional Formula (5) and the abnormal dispersion properties indicated by Conditional Formula (6) can be sufficiently secured. As a result, longitudinal chromatic aberration, lateral chromatic aberration, and second order spectra can be favorably corrected. It is more preferable for the imaging lens 1 to be configured such that the value of $vd\_G1p$ is not less than or equal to the lower limit defined in Conditional Formula (5-1). Further, by configuring the imaging lens 1 such that the value of $vd\_G1p$ is not greater than or equal to the upper limit defined in Conditional Formula (5-1), a necessary refractive index can be secured. This configuration is advantageous from the viewpoint of favorably correcting various aberrations, such as spherical aberration.

$$62 < vd\_G1p < 100 \tag{5-1}$$

In the imaging lens 1, it is more preferable for Conditional Formula (5) (or Conditional Formula (5-1)) to be satisfied, and further for Conditional Formula (6-1) to be satisfied as well. By configuring the imaging lens 1 such that the value of $\theta gF\_G1p + 0.00162 vd\_G1p - 0.6415$ is not greater than or equal to the upper limit defined in Conditional Formula (6-1), the refractive indices of the positive lenses included in the first lens group G1 will not become excessively small. Therefore, sufficiently increasing the refractive powers of the positive lenses is facilitated, which is advantageous from the viewpoint of miniaturizing the first lens group G1. In addition, refractive power can be secured within a range in which the absolute values of the radii of curvature of the positive lenses within the first lens group G1 will not be excessively small. This configuration is advantageous from the viewpoint of favorably correcting various aberrations.

$$0.004 < \theta gF\_G1p + 0.00162 vd\_G1p - 0.6415 < 0.050 \tag{6-1}$$

In the imaging lens 1, it is preferable for the third lens group G3 to have at least one positive lens that satisfies both of Conditional Formulae (7) and (8) below.

$$60 < vd\_G3p \tag{7}$$

$$0.004 < \theta gF\_G3p + 0.00162 vd\_G3p - 0.6415 \tag{8}$$

wherein $vd\_G3p$ is the Abbe's number with respect to the d line of the material of the at least one positive lens within the third lens group G3, and $\theta gF\_G3p$ is the partial dispersion ratio between the g line and the F line of the positive lens within the third lens group G3.

Conditional Formula (7) is related to the Abbe's numbers of the at least one positive lens included in the third lens group G3, and Conditional Formula (8) is related to the partial dispersion ratio between the g line and the F line of the at least one positive lens within the third lens group G3. By configuring the imaging lens 1 such that the value of vd_G3p is not less than or equal to the lower limit defined in Conditional Formula (7) and such that the value of θgF_G3p+0.00162vd_G3p−0.6415 is not less than or equal to the lower limit defined in Conditional Formula (8), the low dispersion properties indicated by Conditional Formula (7) and the abnormal dispersion properties indicated by Conditional Formula (8) can be sufficiently secured. As a result, longitudinal chromatic aberration and lateral chromatic aberration can be favorably corrected. It is more preferable for the imaging lens 1 to be configured such that the value of vd_G3p is not less than or equal to the lower limit defined in Conditional Formula (7-1). Further, by configuring the imaging lens 1 such that the value of vd_G3p is not greater than or equal to the upper limit defined in Conditional Formula (7-1), a necessary refractive index can be secured. This configuration is advantageous from the viewpoint of favorably correcting various aberrations.

$$62<vd\_G3p<100 \qquad (7\text{-}1).$$

In the imaging lens 1, it is more preferable for Conditional Formula (7) (or Conditional Formula (7-1)) to be satisfied, and further for Conditional Formula (8-1) to be satisfied as well. By configuring the imaging lens 1 such that the value of 74 gF_G3p+0.00162vd_G3p−0.6415 is not greater than or equal to the upper limit defined in Conditional Formula (8-1), the refractive index of the at least one positive lens included in the third lens group G3 will not become excessively small. Therefore, sufficiently increasing the refractive powers of the at least one positive lens is facilitated, which is advantageous from the viewpoint of miniaturizing the third lens group G3. In addition, refractive power can be secured within a range in which the absolute value of the radius of curvature of the at least one positive lens within the third lens group G3 will not be excessively small. This configuration is advantageous from the viewpoint of favorably correcting various aberrations.

$$0.004<\theta gF\_G3p+0.00162vd\_G3p-0.6415<0.050 \qquad (8\text{-}1).$$

In the imaging lens 1, it is preferable for the first lens group G1 to have at least one negative lens that satisfies Conditional Formula (9) below:

$$30<vd\_G1n<40 \qquad (9)$$

wherein vd_G1n is the Abbe's number with respect to the d line of the material of the at least one negative lens within the first lens group G1.

By configuring the imaging lens 1 such that the value of vd_G1n is not less than or equal to the lower limit defined in Conditional Formula (9), secondary order chromatic aberration can be favorably corrected. By configuring the imaging lens 1 such that the value of vd_G1n is not greater than or equal to the upper limit defined in Conditional Formula (9), primary order chromatic aberration can be favorably corrected. In addition, by configuring the imaging lens 1 such that the value of vd_G1n is not greater than or equal to the upper limit defined in Conditional Formula (9), the radii of curvature of the positive lenses and the at least one negative lens that constitute the first lens group G1 can be suppressed from becoming excessively small, which is advantageous from the viewpoint of favorably correcting spherical aberration. It is more preferable for Conditional Formula (9-1) to be satisfied, in order to cause these advantageous effects to become more prominent.

$$31<vd\_G1n<38 \qquad (9\text{-}1).$$

In the imaging lens 1, it is preferable for the third lens group G3 to have a single lens having a negative refractive power at the most image side within the third lens group G3, and for the single lens to satisfy Conditional Formula (10) below:

$$40<vd\_G3nr \qquad (10)$$

wherein vd_G3nr is the Abbe's number with respect to the d line of the single lens having a negative refractive power positioned most toward the image side within the third lens group G3.

By configuring the imaging lens 1 such that the value of vd_G3nr is not less than or equal to the lower limit defined in Conditional Formula (10), the dispersion properties of the material of the negative lens provided most toward the image side within the third lens group G3 can be prevented from becoming excessively high, and lateral chromatic aberration can be favorably corrected. It is more preferable for the imaging lens 1 to be configured such that the value of vd_G3nr is not less than or equal to the lower limit defined in Conditional Formula (10-1), in order to cause this advantageous effect to become more prominent. Further, by configuring the imaging lens 1 such that the value of vd_G3nr is not greater than or equal to the upper limit defined in Conditional Formula (10-1), the refractive index of the negative lens provided most toward the image side within the third lens group G3 can be prevented from becoming excessively low, a sufficient amount of refractive power can be achieved. Such a configuration is advantageous from the viewpoint of favorably correcting various aberrations, such as distortion.

$$42<vd\_G3nr<100 \qquad (10\text{-}1).$$

In addition, in the imaging lens 1, it is preferable for Conditional Formula (11) below to be satisfied.

$$0.3<|f2|/f<0.8 \qquad (11)$$

wherein f2 is the focal length of the second lens group G2, and f is the focal length of the entire lens system in a state focused on an object at infinity.

By configuring the imaging lens 1 such that the value of |f2|/f is not less than or equal to the lower limit defined in Conditional Formula (11), the refractive power of the second lens group G2 can be prevented from becoming excessively strong. Therefore, increases in fluctuations in comatic aberration and chromatic aberrations caused by focusing operations can be suppressed, and favorable optical performance can be obtained even when imaging at proximal distances. By configuring the imaging lens 1 such that the value of |f2|/f is not greater than or equal to the upper limit defined in Conditional Formula (11), the refractive power of the second lens group G2 can be prevented from becoming excessively weak. Therefore, an increase in the amount of movement of the second lens group G2 during focusing operations can be favorably suppressed, which is advantageous from the viewpoints of accelerating focusing operations and shortening the total length of the lens system. It is more preferable for Conditional Formula (11-1) to be satisfied, in order to cause the advantageous effects obtained by Conditional Formula (11) being satisfied to become more prominent.

$$0.4<|f2|/f<0.7 \qquad (11\text{-}1).$$

As described above, the imaging lens 1 of the present embodiment is constituted by, in order from the object side to the image side, the first lens group G1 having a positive refractive power, the second lens group G2 having a negative refractive power, and the third lens group G3 having a positive refractive power. The second lens group G2 has at least one positive lens and at least one negative lens. The lens configurations of the first lens group G1 through the third lens group G3 are favorably set. Therefore, the imaging lens 1 can realize miniaturization and a decrease in fluctuations in aberrations caused by focusing operations, as well as high optical performance.

Arbitrary combinations of the preferred configurations described above, including the configurations related to the conditional formulae, are possible. It is preferable for the configurations to be selectively adopted as appropriate, according to specifications required of the imaging lens. Imaging lenses according to three aspects will be listed below as examples of preferred configurations and the advantageous effects obtained thereby will be described. Note that the examples of these three preferred configurations may adopt the above preferable configurations as appropriate.

An imaging lens according to the first preferred configuration is the imaging lens 1 consisting of, in order from the object side to the image side: a first lens group G1 having a positive refractive power; a second lens group G2 having a negative refractive power; and a third lens group G3 having a positive refractive power. The second lens group G2 has at least one positive lens and at least one negative lens, and the second lens group G2 moves along the optical axis from the object side to the image side while the first lens group G1 and the third lens group G3 are fixed with respect to an image formation plane to change focus from an object at infinity to an object at a proximal distance. In the imaging lens according to the first preferred example, Conditional Formulae (1) and (2) described above are satisfied. According to this preferred configuration, secondary order chromatic aberration and fluctuations in chromatic aberrations during focusing operations can be suppressed, because Conditional Formula (1) is satisfied. In addition, the total length of the lens system can be shortened to achieve miniaturization of the imaging lens, while various aberrations can be favorably corrected, because Conditional Formula (2) is satisfied. Note that each of Examples 1 through 6 in the present specification corresponds to an imaging lens of the first preferred configuration.

An imaging lens according to the second preferred configuration is the imaging lens 1 consisting of, in order from the object side to the image side: a first lens group G1 having a positive refractive power; a second lens group G2 having a negative refractive power; and a third lens group G3 having a positive refractive power. The second lens group G2 has at least one positive lens and at least one negative lens, and the entire lens system consists of at most twelve lenses. The second lens group G2 moves along the optical axis from the object side to the image side while the first lens group G1 and the third lens group G3 are fixed with respect to an image formation plane to change focus from an object at infinity to an object at a proximal distance. In the imaging lens according to the second preferred example, Conditional Formula (1) described above is satisfied. According to this preferred configuration, secondary order chromatic aberration and fluctuations in chromatic aberrations during focusing operations can be suppressed, because Conditional Formula (1) is satisfied. In addition, miniaturization and weight reduction of the imaging lens 1 can be achieved, because the entire lens system is constituted by at most twelve lenses. Note that each of Examples 1 through 6 in the present specification corresponds to an imaging lens of the second preferred configuration.

An imaging lens according to the third preferred configuration is the imaging lens 1 consisting of, in order from the object side to the image side: a first lens group G1 having a positive refractive power; a second lens group G2 having a negative refractive power; and a third lens group G3 having a positive refractive power. An aperture stop St is positioned at the object side of the second lens group G2. The second lens group G2 has at least one positive lens and at least one negative lens, and the second lens group G2 moves along the optical axis from the object side to the image side while the first lens group and the third lens group are fixed with respect to an image formation plane to change focus from an object at infinity to an object at a proximal distance. In the imaging lens according to the second preferred example, Conditional Formula (1) described above is satisfied. According to this preferred configuration, secondary order chromatic aberration and fluctuations in chromatic aberrations during focusing operations can be suppressed, because Conditional Formula (1) is satisfied. In addition, the diameters of the lenses that constitute the first lens group G1 and the second lens group G2 can be decreased, because the aperture stop is positioned at the object side of the second lens group G2. In addition, securing space for movement of the second lens group G2 in the direction of the optical axis during focusing operations is facilitated, which is advantageous from the viewpoint of shortening the most proximal imaging distance. Note that each of Examples 1 through 6 in the present specification corresponds to an imaging lens of the third preferred configuration.

Note that with respect to the second preferred configuration described above, for example, the imaging lenses disclosed in Japanese Unexamined Patent Publication Nos. 2014-139699, 2013-033178, and 2013-097212 do not satisfy Conditional Formula (1), and therefore it is difficult for these imaging lenses to sufficiently suppress fluctuations in aberrations caused by focusing operations. In addition, the imaging lenses disclosed in Japanese Unexamined Patent Publication Nos. 2013-033178 and 2012-047870 are constituted by fifteen or sixteen lenses as a whole. Therefore, further miniaturization and weight reduction are required of these lens systems.

In addition, with respect to the third preferred configuration described above, for example, the imaging lenses disclosed in Japanese Unexamined Patent Publication Nos. 2014-139699, 2013-033178, and 2013-097212 do not satisfy Conditional Formula (1), and therefore it is difficult for these imaging lenses to sufficiently suppress fluctuations in aberrations caused by focusing operations. In addition, the imaging lenses disclosed in Japanese Unexamined Patent Publication Nos. 2013-033178, 2013-097212, and 2012-047870 are equipped with aperture stops which are positioned at the image side of the focusing lens groups thereof. In the case that such a configuration is adopted, it is necessary for the aperture stop to be positioned remote from the first lens group, in order to secure space for the second lens group to move in the direction of the optical axis during focusing operations. Therefore, the diameters of the lenses within the first lens group will increase. In addition, this configuration is also not preferable from the viewpoint of shortening the most proximal imaging distance.

Further, in the case that the second lens group of an imaging lens is constituted by two negative lenses as in Examples 1, 3, and 5 of Japanese Unexamined Patent Publication No. 2014-139699, it is difficult to sufficiently suppress fluctuations in various aberrations, such as chromatic aberrations, caused by focusing operations. In addition, in the case that the focusing lens group of an imaging lens is of a one lens configuration as in Examples 9 and 10 of Japanese Unexamined Patent Publication No. 2014-139699 and in Japanese Unexamined Patent Publication No. 2013-097212, it is necessary to decrease fluctuations in aberrations caused by focusing operations. In addition, it is difficult to suppress chromatic aberrations during imaging at proximal distances and to set a short most proximal imaging distance.

Note that the imaging lens of the present disclosure may selectively be one of the aforementioned preferred configurations or an arbitrary combination thereof, as appropriate. In addition, although not illustrated in FIGS. 1 through 6, the imaging lens of the present disclosure may be provided with a light shielding means for suppressing the generation of flare, as well as various types of filters positioned between the lens system and the image formation plane Sim.

Next, examples of the imaging lens 1 of the present disclosure, and particularly examples of the numerical values thereof, will be described.

Example 1

The arrangement of lens groups in an imaging lens of Example 1 is illustrated in FIG. 1. Note that detailed descriptions of the lens groups and each of the lenses illustrated in FIG. 1 have already been given, and therefore redundant descriptions will be omitted here insofar as they are not particularly necessary.

Table 1 shows basic lens data of the imaging lens of Example 1. Here, the optical member PP is also included in Table 1. In the basic lens data of Table 1, ith (i=1, 2, 3, . . . ) lens surface numbers that sequentially increase from the object side to the image side, with the lens surface at the most object side designated as first, are shown in the column Si. The radii of curvature of ith surfaces are shown in the column Ri, the distances between an ith surface and an i+1st surface along the optical axis Z are shown in the column Di. The refractive indices of jth (j=1, 2, 3, . . . ) constituent elements that sequentially increase from the object side to the image side, with the lens at the most object side designated as first, with respect to the d line (wavelength: 587.6 nm) are shown in the column Ndj. The Abbe's numbers of the jth constituent element with respect to the d line are shown in the column vdj. θgFj shows the partial dispersion ratios of jth constituent elements. In addition, the basic lens data also includes the aperture stop St. The mark "∞" is shown in the column of the radius of curvature for the surface that corresponds to the aperture stop St. The signs of the radii of curvature are positive in cases that the surface shape is convex toward the object side, and negative in cases that the surface shape is convex toward the image side.

Note that the partial dispersion ratio θgFj is represented by the formula below:

$$\theta gFj = (ngj - nFj)/(nFj - nCj)$$

wherein ngj is the refractive index of a jth optical element with respect to the g line (wavelength: 435.8 nm), nFj is the refractive index of the jth optical element with respect to the F line (wavelength: 486.1 nm), and nCj is the refractive index of the jth optical element with respect to the C line (wavelength: 656.3 nm).

Table 2 shows values of the focal length f and the back focus Bf when focused on infinity, as well as the F number (FNo.), the full angle of view 2ω, a transverse magnification rate β, and distances among moving surfaces at each of a state focused on infinity and a state focused on a most proximal distance, as various items of data of the imaging lens of Example 1. The value of the back focus Bf is an air converted distance, the units of the full angle of view are degrees, and the units of the distances among surfaces that vary due to focusing operations are mm. FIG. 8 is a collection of diagrams that illustrate aberrations of the imaging lens of Example 1.

In addition, Table 14 to be shown later shows values corresponding to Conditional Formula (1) through (11) for each of the imaging lenses of Examples 1 through 6. Note that in Table 14, the lenses which are included in the first lens group are denoted as L11, L12, L13, and L14, in this order from the object side to the image side, the lenses which are included in the second lens group are denoted as L21 and L22, in this order from the object side to the image side, and the lenses which are included in the third lens group are denoted as L31 through L36, in this order from the object side to the image side, As described above, in each of the tables below, degrees are used as units of angles, and mm are used as the units for lengths. However, it is possible for optical systems to be proportionately enlarged or proportionately reduced and utilized. Therefore, other appropriate units may be used. In addition, the tables below show numerical values which are rounded off at a predetermined number of digits. Further, the meanings of the symbols, the units of the symbols, and the manners in which the symbols are shown in the tables related to Example 1 are the same in each of the tables to be shown later related to Examples 2 through 6.

TABLE 1

Example 1

| Si | Ri | Di | Ndj | vdj | θgFj |
|---|---|---|---|---|---|
| 1 | 134.54219 | 4.550 | 1.51633 | 64.14 | 0.53531 |
| 2 | −308.48240 | 0.520 | | | |
| 3 | 57.11452 | 6.050 | 1.49700 | 81.61 | 0.53887 |
| 4 | ∞ | 0.180 | | | |
| 5 | 54.95203 | 7.010 | 1.59522 | 67.73 | 0.54426 |
| 6 | −138.92000 | 3.000 | 1.74950 | 35.33 | 0.58189 |
| 7 | 65.12954 | 8.050 | | | |
| 8 (St) | ∞ | DD [8] | | | |
| 9 | −99.96703 | 2.610 | 1.92286 | 18.90 | 0.64960 |
| 10 | −53.99500 | 1.490 | 1.63854 | 55.38 | 0.54858 |
| 11 | 38.38332 | DD [11] | | | |
| 12 | −299.93361 | 2.800 | 1.59522 | 67.73 | 0.54426 |
| 13 | −65.51447 | 0.250 | | | |
| 14 | 65.03027 | 6.510 | 1.83481 | 42.72 | 0.56486 |
| 15 | −43.00300 | 1.350 | 1.67270 | 32.10 | 0.59891 |
| 16 | 33.75440 | 9.180 | | | |
| 17 | 39.82254 | 6.400 | 1.71300 | 53.87 | 0.54587 |
| 18 | −107.03524 | 5.750 | | | |
| 19 | −75.17060 | 1.350 | 1.51742 | 52.43 | 0.55649 |
| 20 | 75.17060 | 20.784 | | | |
| 21 | ∞ | 2.850 | 1.51633 | 64.14 | 0.53531 |
| 22 | ∞ | | | | |

TABLE 2

Example 1

| | Infinity | Proximal |
|---|---|---|
| f | 87.495 | |
| Bf | 24.663 | |
| FNo. | 2.06 | 2.35 |

TABLE 2-continued

Example 1

|  | Infinity | Proximal |
|---|---|---|
| 2ω | 18.4 | 16.0 |
| β | 0.00 | 0.14 |
| DD [8] | 4.600 | 12.696 |
| DD [11] | 18.753 | 10.657 |

Diagrams that illustrate the spherical aberration, the offense against the sine condition, the astigmatism, the distortion, and the lateral chromatic aberration of the imaging lens of Example 1 are shown in this order from the left side of the drawing sheet in FIG. 8. The diagrams that illustrate each of the aberrations show aberrations using the d line (wavelength: 587.6 nm) as a reference wavelength. The diagrams that illustrate spherical aberration also show aberrations related to a wavelength of 656.3 nm (the C line), a wavelength of 486.1 nm (the F line), and a wavelength of 435.8 nm (the g line). In the diagrams that illustrate astigmatism, aberrations in the sagittal direction are indicated by a solid line, while aberrations in the tangential direction are indicated by a broken line. In the diagrams that illustrate lateral chromatic aberration also show aberrations related to the C line, the F line, and the g line. In the diagrams that illustrate spherical aberrations, "FNo." denotes F numbers. In the other diagrams that illustrate the aberrations, w denotes half angles of view. The meanings of the symbols, the units of the symbols, and the manner in which the data are shown in the FIG. 8 are the same for the diagrams that illustrate aberrations related to Examples 2 through 6 to be described later.

Example 2

FIG. 2 illustrates the arrangement of lens groups in the imaging lens of Example 2. Tables 3 and 4 show basic lens data and various items of data for the imaging lens of Example 2, respectively. In addition, FIG. 9 shows diagrams that illustrate aberrations of the imaging lens of Example 2.

TABLE 3

Example 2

| Si | Ri | Di | Ndj | vdj | θgFj |
|---|---|---|---|---|---|
| 1 | 161.39134 | 4.200 | 1.51633 | 64.14 | 0.53531 |
| 2 | 18334.01582 | 1.500 | | | |
| 3 | 79.87877 | 8.000 | 1.49700 | 81.61 | 0.53887 |
| 4 | −334.84103 | 0.150 | | | |
| 5 | 53.69107 | 7.260 | 1.53775 | 74.70 | 0.53936 |
| 6 | −181.44026 | 3.000 | 1.73800 | 32.26 | 0.58995 |
| 7 | 104.94116 | 10.000 | | | |
| 8 (St) | ∞ | DD [8] | | | |
| 9 | −93.44318 | 2.860 | 1.92286 | 20.88 | 0.63900 |
| 10 | −55.16805 | 1.500 | 1.59522 | 67.73 | 0.54426 |
| 11 | 39.06673 | DD [11] | | | |
| 12 | 693.40515 | 4.000 | 1.53775 | 74.70 | 0.53936 |
| 13 | −59.94664 | 3.000 | | | |
| 14 | 72.00740 | 10.010 | 1.80400 | 46.58 | 0.55730 |
| 15 | −41.87081 | 1.350 | 1.67270 | 32.10 | 0.59891 |
| 16 | 30.01643 | 6.349 | | | |
| 17 | 36.10244 | 7.200 | 1.80400 | 46.58 | 0.5573 |
| 18 | −2613.83832 | 7.038 | | | |
| 19 | 195.53579 | 1.350 | 1.51633 | 64.14 | 0.53531 |
| 20 | 39.48731 | 18.000 | | | |
| 21 | ∞ | 2.850 | 1.51633 | 64.14 | 0.53531 |
| 22 | ∞ | | | | |

TABLE 4

Example 2

|  | Infinity | Proximal |
|---|---|---|
| f | 87.029 | |
| Bf | 21.880 | |
| FNo. | 2.06 | 2.37 |
| 2ω | 19.0 | 16.6 |
| β | 0.00 | 0.14 |
| DD [8] | 4.000 | 12.982 |
| DD [11] | 19.250 | 10.268 |

Example 3

FIG. 3 illustrates the arrangement of lens groups in the imaging lens of Example 3. Tables 5 and 6 show basic lens data and various items of data for the imaging lens of Example 3, respectively. In addition, FIG. 10 shows diagrams that illustrate aberrations of the imaging lens of Example 3.

TABLE 5

Example 3

| Si | Ri | Di | Ndj | vdj | θgFj |
|---|---|---|---|---|---|
| 1 | 171.10816 | 4.300 | 1.53172 | 48.84 | 0.56309 |
| 2 | −216.95802 | 0.150 | | | |
| 3 | 50.87975 | 6.000 | 1.49700 | 81.61 | 0.53887 |
| 4 | ∞ | 0.150 | | | |
| 5 | 42.08665 | 6.710 | 1.61800 | 63.33 | 0.54414 |
| 6 | −147.07879 | 3.000 | 1.74950 | 35.33 | 0.58189 |
| 7 | 41.93466 | 8.300 | | | |
| 8 (St) | ∞ | DD [8] | | | |
| 9 | −94.61489 | 2.610 | 1.95906 | 17.47 | 0.65993 |
| 10 | −51.15155 | 1.500 | 1.65844 | 50.88 | 0.55612 |
| 11 | 37.19456 | DD [11] | | | |
| 12 | 284.45806 | 2.600 | 1.49700 | 81.54 | 0.53748 |
| 13 | −87.31973 | 0.100 | | | |
| 14 | 115.45097 | 5.510 | 1.83481 | 42.72 | 0.56486 |
| 15 | −48.31101 | 1.350 | 1.67270 | 32.10 | 0.59891 |
| 16 | 40.98217 | 10.000 | | | |
| 17 | 49.21220 | 5.750 | 1.71300 | 53.87 | 0.54587 |
| 18 | −62.20075 | 7.500 | | | |
| 19 | −51.68723 | 1.350 | 1.54814 | 45.78 | 0.56859 |
| 20 | 399.48375 | 23.401 | | | |
| 21 | ∞ | 2.850 | 1.51633 | 64.14 | 0.53531 |
| 22 | ∞ | | | | |

TABLE 6

Example 3

|  | Infinity | Proximal |
|---|---|---|
| f | 90.000 | |
| Bf | 27.281 | |
| FNo. | 2.05 | 2.34 |
| 2ω | 18.4 | 16.0 |
| β | 0.00 | 0.14 |
| DD [8] | 3.500 | 11.216 |
| DD [11] | 15.500 | 7.784 |

Example 4

FIG. 4 illustrates the arrangement of lens groups in the imaging lens of Example 4. Example 4 is an example of a configuration in which the third lens group G3 is of a six lens configuration constituted by lenses L31 through L36, in which the third-group second lens group G32 is constituted by one cemented lens formed by cementing two lenses L34 and L35 together. Tables 7 and 8 show basic lens data and various items of data for the imaging lens of Example 4, respectively. In addition, FIG. 11 shows diagrams that illustrate aberrations of the imaging lens of Example 4.

TABLE 7

Example 4

| Si | Ri | Di | Ndj | vdj | θgFj |
|---|---|---|---|---|---|
| 1 | 113.20817 | 6.000 | 1.56384 | 60.67 | 0.54030 |
| 2 | −380.00065 | 0.150 | | | |
| 3 | 70.00000 | 5.500 | 1.49700 | 81.61 | 0.53887 |
| 4 | 5887.83753 | 0.150 | | | |
| 5 | 47.82264 | 6.760 | 1.61800 | 63.33 | 0.54414 |
| 6 | −144.23297 | 1.590 | 1.72047 | 34.71 | 0.58350 |
| 7 | 54.56241 | 9.705 | | | |
| 8 (St) | ∞ | DD [8] | | | |
| 9 | −157.76582 | 1.510 | 1.63854 | 55.38 | 0.54858 |
| 10 | 28.56138 | 2.850 | 1.92286 | 18.90 | 0.64960 |
| 11 | 34.57598 | DD [11] | | | |
| 12 | 97.87959 | 4.000 | 1.60300 | 65.44 | 0.54022 |
| 13 | −61.34955 | 0.100 | | | |
| 14 | 411.38749 | 6.010 | 1.80400 | 46.58 | 0.55730 |
| 15 | −95.45173 | 1.350 | 1.67270 | 32.10 | 0.59891 |
| 16 | 36.32093 | 7.500 | | | |
| 17 | 45.67941 | 7.860 | 1.88300 | 40.76 | 0.56679 |
| 18 | −35.68214 | 2.000 | 1.68893 | 31.07 | 0.60041 |
| 19 | −384.43582 | 3.662 | | | |
| 20 | −57.41352 | 1.350 | 1.51633 | 64.14 | 0.53531 |
| 21 | 268.42823 | 20.816 | | | |
| 22 | ∞ | 2.850 | 1.51633 | 64.14 | 0.53531 |
| 23 | ∞ | | | | |

TABLE 8

Example 4

| | Infinity | Proximal |
|---|---|---|
| f | 87.321 | |
| Bf | 24.697 | |
| FNo. | 2.06 | 2.31 |
| 2ω | 19.0 | 16.6 |
| β | 0.00 | 0.13 |
| DD [8] | 4.794 | 13.047 |
| DD [11] | 18.380 | 10.127 |

Example 5

FIG. 5 illustrates the arrangement of lens groups in the imaging lens of Example 5. Example 5 is an example of a configuration in which the third-group first lens group G31 is constituted by one single lens L31, and the third-group second lens group G32 is constituted by one cemented lens formed by cementing three lenses L32, L33, and L34 together.

Tables 9 and 10 show basic lens data and various items of data for the imaging lens of Example 4, respectively. In the basic lens data of Table 9, the surface numbers of aspherical surfaces are denoted with the mark "*", and the radii of curvature of paraxial regions are shown as the radii of curvature of the aspherical surfaces. Note that the shapes of the surfaces of the lenses and the signs of the refractive indices thereof are considered in the paraxial region for lenses that include aspherical surfaces. Table 11 shows aspherical surface data for the imaging lens of Example 5. In addition, FIG. 12 shows diagrams that illustrate aberrations of the imaging lens of Example 5. Table 11 shows the surface numbers of the aspherical surfaces and the aspherical surface coefficients related to these aspherical surfaces. Here, in the numerical values of the aspherical surface data, "E-n (n: integer)" means "·10$^{-n}$". Note that the aspherical surface coefficients are the values of the coefficients KA and Am (m=3, 4, 5, . . . , 20) in the following aspherical surface formula:

$$Zd = \frac{C \times h^2}{1 + \sqrt{1 - KA \times C^2 \times h^2}} + \sum_m Am \times h^m \quad \text{[Formula 1]}$$

wherein: Zd is the depth of the aspherical surface (the length of a normal line that extends from a point on the aspherical surface having a height h to a plane perpendicular to the optical axis that contacts the peak of the aspherical surface), h is the height (the distance from the optical axis to the surface of the lens), C is the inverse of the paraxial radius of curvature, and KA and Am are aspherical surface coefficients (m=3, 4, 5, . . . , 20).

TABLE 9

Example 5

| Si | Ri | Di | Ndj | vdj | θgFj |
|---|---|---|---|---|---|
| 1 | 256.04217 | 3.000 | 1.51742 | 52.43 | 0.55649 |
| 2 | −416.45669 | 1.220 | | | |
| 3 | 56.55825 | 7.000 | 1.49700 | 81.54 | 0.53748 |
| 4 | −246.42222 | 0.100 | | | |
| 5 | 49.87626 | 6.810 | 1.60300 | 65.44 | 0.54022 |
| 6 | −117.49447 | 4.000 | 1.83400 | 37.16 | 0.57759 |
| 7 | 63.73847 | 8.000 | | | |
| 8 (St) | ∞ | DD [8] | | | |
| 9 | −95.63732 | 3.010 | 2.00272 | 19.32 | 0.64514 |
| 10 | −67.19060 | 1.650 | 1.53775 | 74.70 | 0.53936 |
| 11 | 36.59838 | DD [11] | | | |
| *12 | −98.28826 | 2.750 | 1.55332 | 71.68 | 0.54029 |
| *13 | −75.00000 | 3.000 | | | |
| 14 | 89.66312 | 8.010 | 1.69680 | 55.53 | 0.54341 |
| 15 | −33.71288 | 1.410 | 1.59551 | 39.24 | 0.58043 |
| 16 | 26.05104 | 8.500 | 1.75500 | 52.32 | 0.54765 |
| 17 | −84.47282 | 4.258 | | | |
| 18 | −27.49980 | 2.000 | 1.51633 | 64.14 | 0.53531 |
| 19 | −77.73467 | 26.039 | | | |
| 20 | ∞ | 2.850 | 1.51633 | 64.14 | 0.53531 |
| 21 | ∞ | | | | |

* aspherical surface

TABLE 10

Example 5

| | Infinity | Proximal |
|---|---|---|
| f | 87.284 | |
| Bf | 29.919 | |
| FNo. | 2.06 | 2.35 |
| 2ω | 19.0 | 16.6 |
| β | 0.00 | 0.14 |
| DD [8] | 5.000 | 14.376 |
| DD [11] | 17.000 | 7.624 |

TABLE 11

Example 5

| Surface Number | 12 | 13 |
|---|---|---|
| KA | 1.0000000E+00 | 1.0000000E+00 |
| A3 | −1.1422608E−05 | −1.1351787E−05 |

TABLE 11-continued

Example 5

| Surface Number | 12 | 13 |
|---|---|---|
| A4 | 9.7469924E−06 | 3.9502577E−06 |
| A5 | 2.4521799E−07 | 3.4171182E−07 |
| A6 | 1.3221296E−09 | −6.0449277E−09 |
| A7 | −8.6693458E−10 | −1.6641184E−09 |
| A8 | −1.0747008E−10 | −1.0934156E−10 |
| A9 | −7.8994198E−12 | −3.7620680E−12 |
| A10 | −3.6319760E−13 | 1.9147710E−15 |
| A11 | −5.9314083E−15 | 5.0499868E−15 |
| A12 | 1.1758217E−15 | 3.7424058E−16 |
| A13 | 1.4712149E−16 | 3.7242945E−18 |
| A14 | 1.0835327E−17 | −2.0585811E−18 |
| A15 | 2.6174460E−19 | −2.9476744E−19 |
| A16 | −2.6169408E−20 | −1.1098269E−20 |
| A17 | −4.8675474E−21 | 5.0994173E−22 |
| A18 | −4.2571379E−22 | 9.2017809E−23 |
| A19 | −1.1512165E−23 | 3.6464740E−24 |
| A20 | 2.6949871E−24 | −4.1095806E−25 |

Example 6

FIG. 6 illustrates the arrangement of lens groups in the imaging lens of Example 6. Table 12 shows basic lens data for the imaging lens of Example 6, and Table 13 shows data related to various items and the distances among moving surfaces. In addition, FIG. 13 shows diagrams that illustrate aberrations of the imaging lens of Example 6. The configuration of the imaging lens of Example 6 is the same as that of the imaging lens of Example 1, except that an APD filter APDF is provided adjacent to the aperture stop St at the object side thereof. In Example 6, the APD filter APDF is positioned adjacent to the aperture stop St at the object side thereof, but the APD filter APDF may alternatively be positioned adjacent to the aperture stop St at the image side thereof.

Note that the imaging lenses of Example 6 and Example 1 are configured such that (1) the distance along the optical axis from the lens surface of the imaging lens most toward the object side to the lens surface of the imaging lens most toward the image side in a state focused on an object at infinity and (2) the distance along the optical axis from the lens surface within the second lens group G2 most toward the image side to the lens surface within the third lens group G3 most toward the object side in a state focused on an object at infinity are equal. For this reason, the imaging lens of Example 6 may be considered to be an example of a configuration in which the focus position is shifted from that of the imaging lens of Example 1 for an amount corresponding to the thickness along the optical axis of the APD filter APDF.

TABLE 12

Example 6

| Si | Ri | Di | Ndj | vdj | θgFj |
|---|---|---|---|---|---|
| 1 | 134.54219 | 4.550 | 1.51633 | 64.14 | 0.53531 |
| 2 | −308.48240 | 0.520 | | | |
| 3 | 57.11452 | 6.050 | 1.49700 | 81.61 | 0.53887 |
| 4 | ∞ | 0.180 | | | |
| 5 | 54.95203 | 7.010 | 1.59522 | 67.73 | 0.54426 |
| 6 | −138.92000 | 3.000 | 1.74950 | 35.33 | 0.58189 |
| 7 | 65.12954 | 6.029 | | | |
| 8 | ∞ | 0.200 | 1.53000 | 56.00 | 0.55058 |
| 9 | ∞ | 1.821 | | | |
| 10 (St) | ∞ | DD [10] | | | |
| 11 | −99.96703 | 2.610 | 1.92286 | 18.90 | 0.64960 |
| 12 | −53.99500 | 1.490 | 1.63854 | 55.38 | 0.54858 |
| 13 | 38.38332 | DD [13] | | | |
| 14 | −299.93361 | 2.800 | 1.59522 | 67.73 | 0.54426 |
| 15 | −65.51447 | 0.250 | | | |
| 16 | 65.03027 | 6.510 | 1.83481 | 42.72 | 0.56486 |
| 17 | −43.00300 | 1.350 | 1.67270 | 32.10 | 0.59891 |
| 18 | 33.75440 | 9.180 | | | |
| 19 | 39.82254 | 6.400 | 1.71300 | 53.87 | 0.54587 |
| 20 | −107.03524 | 5.750 | | | |
| 21 | −75.17060 | 1.350 | 1.51742 | 52.43 | 0.55649 |
| 22 | 75.17060 | 20.784 | | | |
| 23 | ∞ | 2.850 | 1.51633 | 64.14 | 0.53531 |
| 24 | ∞ | | | | |

TABLE 13

Example 6

| | Infinity | Proximal |
|---|---|---|
| f | 87.463 | |
| Bf | 24.770 | |
| FNo. | 2.06 | 2.35 |
| 2ω | 18.6 | 16.4 |
| β | 0.00 | 0.14 |
| DD [10] | 4.600 | 12.692 |
| DD [13] | 18.753 | 10.661 |

Table 14 shows values corresponding to Conditional Formula (1) through (11) for each of the imaging lenses of Examples 1 through 6. As shown in Table 14, all of Conditional Formulae (1) through (11) are satisfied in each of the imaging lenses 1 of Examples 1 through 6, and further, all of Conditional Formulae (1-1) through (11-1), which define more favorable ranges within the ranges defined by Conditional Formulae (1) through (11), are satisfied. The advantageous effects obtained by these configurations are as described in detail previously.

TABLE 14

| Formula | Condition | Example 1 | | Example 2 | | Example 3 | |
|---|---|---|---|---|---|---|---|
| 1 | vd_G2p | L21 | | L21 | | L21 | |
| | | 18.90 | | 20.88 | | 17.47 | |
| 2 | TL/f | 1.315 | | 1.424 | | 1.257 | |
| 3 | vd_G2n | L22 | | L22 | | L22 | |
| | | 55.38 | | 67.73 | | 50.88 | |
| 4 | vd_G1pa | 71.16 | | 73.48 | | 64.59 | |
| 5 | vd_G1p | L12 | L13 | L12 | L13 | L12 | L13 |
| | | 81.61 | 67.73 | 81.61 | 74.70 | 81.61 | 63.33 |
| 6 | θgF_G1p + 0.00162vd_G1p − 0.6415 | L12 | L13 | L12 | L13 | L12 | L13 |
| | | 0.0295 | 0.0124 | 0.0295 | 0.0187 | 0.0295 | 0.0052 |
| 7 | vd_G3p | L31 | | L31 | | L31 | |
| | | 67.73 | | 74.70 | | 81.54 | |

TABLE 14-continued

| Formula | Condition | | | | | | |
|---|---|---|---|---|---|---|---|
| 8 | θgF_G3p + 0.00162vd_G3p − 0.6415 | L31 0.0124 | | L31 0.0187 | | L31 0.0295 | |
| 9 | vd_G1n | L14 35.33 | | L14 32.26 | | L14 35.33 | |
| 10 | vd_G3nr | L35 52.43 | | L35 64.14 | | L35 45.78 | |
| 11 | |f2|/f | 0.549 | | 0.593 | | 0.501 | |

| Formula | Condition | Example 4 | | Example 5 | | Example 6 | |
|---|---|---|---|---|---|---|---|
| 1 | vd_G2p | L22 18.90 | | L21 19.32 | | L21 18.90 | |
| 2 | TL/f | 1.328 | | 1.336 | | 1.317 | |
| 3 | vd_G2n | L21 55.38 | | L22 74.70 | | L22 55.38 | |
| 4 | vd_G1pa | 68.54 | | 66.47 | | 71.16 | |
| 5 | vd_G1p | L12 81.61 | L13 63.33 | L12 81.54 | L13 65.44 | L12 81.61 | L13 67.73 |
| 6 | θgF_G1p + 0.00162vd_G1p − 0.6415 | L12 0.0295 | L13 0.0052 | L12 0.0281 | L13 0.0046 | L12 0.0295 | L13 0.0124 |
| 7 | vd_G3p | L31 65.44 | | L31 71.68 | | L31 67.73 | |
| 8 | θgF_G3p + 0.00162vd_G3p − 0.6415 | L31 0.0046 | | L31 0.0148 | | L31 0.0124 | |
| 9 | vd_G1n | L14 34.71 | | L14 37.16 | | L14 35.33 | |
| 10 | vd_G3nr | L36 64.14 | | L35 64.14 | | L35 52.43 | |
| 11 | |f2|/f | 0.555 | | 0.622 | | 0.550 | |

Note that FIG. 1 illustrates an example in which the optical member PP is provided between the lens system and the image formation plane Sim. Alternatively, various filters such as low pass filters and filters that cut off specific wavelength bands may be provided among each of the lenses instead of being provided between the lens system and the image formation plane Sim. As a further alternative, coatings that have the same functions as the various filters may be administered on the surfaces of the lenses.

As can be understood from each of the above sets of numerical value data and the diagrams that illustrate aberrations, the imaging lenses of Examples 1 through 6 have small F values of 2.1 or less when focused on an object at infinity and achieve a large aperture ratio. It can also be understood that various aberrations are favorably corrected both when focused at infinity and when focused at a most proximal distance. In addition, the focal lengths of the imaging lenses of Examples 1 through 6 are 100 mm or greater as 35 mm equivalent converted values. These focal lengths are favorably suited for use in medium telephoto imaging or telephoto imaging. Particularly, 35 mm equivalent converted focal lengths within a range from 120 mm to 140 mm are favorably suited for use in medium telephoto imaging or telephoto imaging. In addition, the imaging lenses of Examples 1 through 6 are configured such that the value of TL/f (f is the focal length of the entire lens system in a state focused on an object at infinity, and TL is the distance along the optical axis from the lens surface most toward the object side within the first lens group G1 to the image formation plane, in the case that back focus is an air converted distance) is within a range from 1.0 to 1.6. This configuration is advantageous from the viewpoints of shortening the total length of the lens system while correcting various aberrations.

(Embodiment of Imaging Apparatus)

Figure 14B:
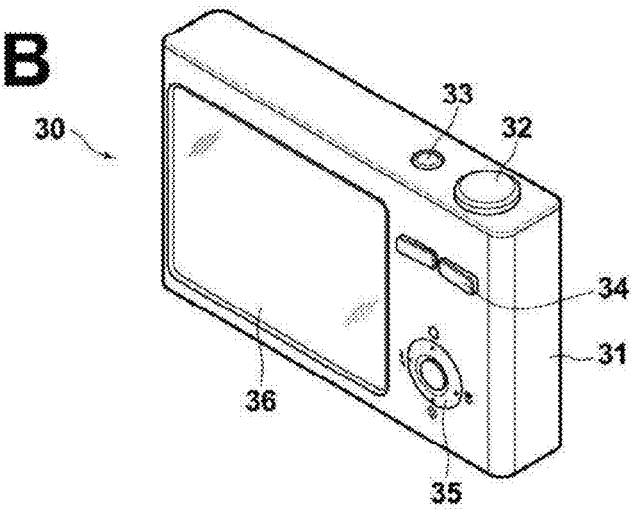
FIG. 14B is a perspective view that illustrates the rear side of an imaging apparatus according to an embodiment of the present disclosure.

Next, an imaging apparatus according to an embodiment of the present disclosure will be described with reference to FIG. 14A and FIG. 14B, A camera 30 illustrated in the perspective views of FIG. 14A and FIG. 14B is a so called mirrorless single lens digital camera, onto which an exchangeable lens 20 is interchangeably mounted. FIG. 14A illustrates the outer appearance of the camera 30 as viewed from the front, and FIG. 14B illustrates the outer appearance of the camera 30 as viewed from the rear.

The camera 30 is equipped with a camera body 31. A shutter release button 32 and a power button 33 are provided on the upper surface of the camera body 31. Operating sections 34 and 35 and a display section 36 are provided on the rear surface of the camera body 31. The display section 36 displays images which have been photographed and images within the angle of view prior to photography.

A photography opening, in to which light from targets of photography enters, is provided at the central portion of the front surface of the camera body 31. A mount 37 is provided at a position corresponding to the photography opening. The exchangeable lens 20 is mounted onto the camera body 31 via the mount 37. The exchangeable lens 20 is the imaging lens 1 of the present disclosure housed in a lens barrel.

An imaging element (not shown), such as a CCD that receives images of subjects formed by the exchangeable lens 20 and outputs image signals corresponding to the images, a signal processing circuit that processes the image signals output by the imaging element to generate images, and a recording medium for recording the generated images, are provided within the camera body 31. In this camera 30, photography of still images and videos is enabled by pressing the shutter release button 32. Image data obtained by photography or video imaging are recorded in the recording medium.

By applying the imaging lens of the present disclosure as the interchangeable lens 20 for use in such a mirrorless single lens camera 30, the camera 30 can be sufficiently compact even in a state in which the lens is mounted. In addition, images obtained by the camera 30 can be those having favorable image quality.

The present disclosure has been described with reference to the embodiments and Examples thereof. However, the present disclosure is not limited to the embodiments and Examples described above, and various modifications are possible. For example, the values of the radii of curvature, the distances among surfaces, the refractive indices, the Abbe's numbers, the aspherical surface coefficients of each lens component, etc., are not limited to the numerical values indicated in connection with the Examples, and may be other values.

What is claimed is:

1. An imaging lens consisting of, in order from the object side to the image side:
    a first lens group having a positive refractive power;
    a second lens group having a negative refractive power; and
    a third lens group having a positive refractive power;
    the second lens group consisting of a positive lens and a negative lens;
    the second lens group moving along the optical axis from the object side to the image side while the first lens group and the third lens group are fixed with respect to an image formation plane to change focus from an object at infinity to an object at a proximal distance; and
    Conditional Formulae (1) and (2) below being satisfied:

$$15 < vd\_G2p < 22 \tag{1}$$

$$1.0 < TL/f < 1.6 \tag{2}$$

wherein vd_G2p is the Abbe's number with respect to the d line of the material of the at least one positive lens within the second lens group, TL is the distance along the optical axis from the lens surface most toward the object side within the first lens group to the image formation plane with back focus as an air converted distance, and f is the focal length of the entire lens system in a state focused on an object at infinity.

2. An imaging lens as defined in claim 1, in which Conditional Formula (3) below is satisfied:

$$48 < vd\_G2n < 78 \tag{3}$$

wherein vd_G2n is the Abbe's number with respect to the d line of the material of the negative lens within the second lens group.

3. An imaging lens as defined in claim 1, wherein:
    the second lens group consists of a cemented lens formed by cementing a single positive lens and a single negative lens together.

4. An imaging lens as defined in claim 1, wherein:
    the first lens group to has at least two positive lenses; and Conditional Formula (4) below is satisfied:

$$58 < vd\_G1pa \tag{4}$$

wherein vd_G1pa is the average Abbe's number with respect to the d line of the materials of the positive lenses within the first lens group.

5. An imaging lens as defined in claim 1, wherein
    the first lens group to has at least two positive lenses that satisfy both of Conditional Formulae (5) and (6) below:

$$60 < vd\_G1p \tag{5}$$

$$0.004 < \theta gF\_G1p + 0.00162 vd\_G1p - 0.6415 \tag{6}$$

wherein vd_G1p is the Abbe's number with respect to the d line of the materials of the positive lenses within the first lens group, and θgF_G1p is the partial dispersion ratio between the g line and the F line of the positive lenses within the first lens group.

6. An imaging lens as defined in claim 1, wherein:
    the third lens group has at least one positive lens that satisfies both of Conditional Formulae (7) and (8) below:

$$60 < vd\_G3p \tag{7}$$

$$0.004 < \theta gF\_G3p + 0.00162 vd\_G3p - 0.6415 \tag{8}$$

wherein vd_G3p is the Abbe's number with respect to the d line of the material of the at least one positive lens within the third lens group, and θgF_G3p is the partial dispersion ratio between the g line and the F line of the positive lens within the third lens group.

7. An imaging lens as defined in claim 1, wherein:
    the first lens group has at least one negative lens that satisfies Conditional Formula (9) below:

$$30 < vd\_G1n < 40 \tag{9}$$

wherein vd_G1n is the Abbe's number with respect to the d line of the material of the at least one negative lens within the first lens group.

8. An imaging lens as defined in claim 1, wherein:
    the first lens group has at least three positive lenses and at least one negative lens.

9. An imaging lens as defined in claim 1, wherein:
    the first lens group consists of three positive lenses and one negative lens.

10. An imaging lens as defined in claim 1, wherein:
    the third lens group has at least two positive lenses and at least two negative lenses; and
    the third lens group as a whole consists of at most five lenses.

11. An imaging lens as defined in claim 1, wherein:
    the third lens group has a lens component having a negative refractive power at the most image side within the third lens group.

12. An imaging lens as defined in claim 11, wherein:
    the third lens group has a single lens having a negative refractive power at the most image side within the third lens group; and
    the single lens satisfies Conditional Formula (10) below:

$$40 < vd\_G3nr \tag{10}$$

wherein vd_G3nr is the Abbe's number with respect to the d line of the single lens having a negative refractive power positioned most toward the image side within the third lens group.

13. An imaging lens as defined in claim 11, wherein:
    the third lens group has a single lens having a negative refractive power at the most image side within the third lens group, and a single lens having a positive refractive power positioned adjacent to the single lens having a negative refractive power at the object side thereof.

14. An imaging lens as defined in claim 1, in which Conditional Formula (11) below is satisfied:

$$0.3 < |f2|/f < 0.8 \tag{11}$$

wherein f2 is the focal length of the second lens group, and f is the focal length of the entire lens system in a state focused on an object at infinity.

15. An imaging lens as defined in claim 1, wherein:
    an aperture stop is positioned at the image side of the lens surface most toward the object side within the first lens group; and
    a filter, of which the transmissivity decreases as the distance from the optical axis increases, is positioned adjacent to the aperture stop at one of the object side and the image side thereof.

16. An imaging apparatus equipped with an imaging lens as defined in claim 1.

* * * * *